US005666510A

United States Patent [19]
Mitsuishi et al.

[11] Patent Number: 5,666,510
[45] Date of Patent: Sep. 9, 1997

[54] DATA PROCESSING DEVICE HAVING AN EXPANDABLE ADDRESS SPACE

[75] Inventors: Naoki Mitsuishi, Kodaira; Shiro Baba, Kokubunji; Hiromi Nagayama, Kodaira; Tsutomu Hayashi, Koganei; Yukihide Hayakawa, Kodaira, all of Japan

[73] Assignee: Hitachi, Ltd., Tokyo, Japan

[21] Appl. No.: 582,379

[22] Filed: Jan. 11, 1996

Related U.S. Application Data

[63] Continuation of Ser. No. 95,901, Jul. 22, 1993, abandoned, which is a continuation-in-part of Ser. No. 877,890, Apr. 28, 1992, abandoned.

[30] Foreign Application Priority Data

| May 8, 1991 | [JP] | Japan | 3-132042 |
| Feb. 27, 1992 | [JP] | Japan | 4-076151 |
| Aug. 3, 1992 | [JP] | Japan | 4-226447 |

[51] Int. Cl.$^6$ .................................................. G06F 7/20
[52] U.S. Cl. .................... 711/220; 711/214; 711/202
[58] Field of Search ................................. 395/375, 800, 395/308, 421.02, 421.04, 412, 421.1

[56] References Cited

U.S. PATENT DOCUMENTS

| 4,339,795 | 7/1982 | Brereton et al. | 395/308 |
| 4,901,268 | 2/1990 | Judd | 364/745 |
| 4,926,322 | 5/1990 | Stimac et al. | 395/500 |
| 5,057,837 | 10/1991 | Colwell et al. | 341/55 |
| 5,155,820 | 10/1992 | Gibson | 395/375 |
| 5,159,689 | 10/1992 | Shiraishi | 395/800 |

OTHER PUBLICATIONS

Intel, "Introduction to the 80386", 1985, pp. 2–1 thru 2–10.
Hitachi Single-Chip Microcomputer H8/330, HD6473308, HD6433308 Hardware Manual, First Edition, Dec. 1989, pp. 25–77 and 340. (English Version of Item No. 1 Above).
Hitachi Single-Chip Microcomputer H8/532, HD6475328, HD6435328 Hardware Manual, First Edition, Aug. 1989, pp. 23–73 and 90–105. (English Version of Item No. 3 Above).

*Primary Examiner*—Jack B. Harvey
*Assistant Examiner*—Jeffrey K. Seto
*Attorney, Agent, or Firm*—Fay, Sharpe, Beall, Fagan, Minnich & McKee

[57] ABSTRACT

A CPU has an upper compatibility with a low-order CPU to expand a continuously usable address space relatively. For latching data information, registers are constructed for being an address register with a bit number larger than the address bit number of a low-order CPU. The data information has its byte/word size specified by the size bit of an operation code. The utilization of the data information of a long word size is specified by either the prefix code or the operation code to which is newly added the same bit number as that of the low-order CPU. For the data information of the byte size, the high-/low-orders of the byte size register to be utilized are specified by predetermined 1 bit of a register specifying field. For the data information of the word size, the high-/low-orders of the word size register are specified by the predetermined 1 bit of that data information.

7 Claims, 23 Drawing Sheets

FIG. 2

| 15 | | 0 | 7 | | 0 |
|---|---|---|---|---|---|
| 7 | | 0 | | | 0 |
| | R0H | | | R0L | |
| | R1H | | | R1L | |
| | R2H | | | R2L | |
| | R3H | | | R3L | |
| | R4H | | | R4L | |
| | R5H | | | R5L | |
| | R6H | | | R6L | |
| | R7H | | | R7L | |

| 15 | 0 |
|---|---|
| PC | |

| | 7 | | | 3 | 2 | 1 | 0 |
|---|---|---|---|---|---|---|---|
| CCR | I | | | N | Z | V | C |

FIG. 4

| | | | |
|---|---|---|---|
| 23　15 | | 7　0 | 7　0 |
| E0 | R0H | R0L |
| E1 | R1H | R1L |
| E2 | R2H | R2L |
| E3 | R3H | R3L |
| E4 | R4H | R4L |
| E5 | R5H | R5L |
| E6 | R6H | R6L |
| E7 | R7H | R7L |

| 23　0 |
|---|
| PC |

| 7 | 3 | 2 | 1 | 0 |
|---|---|---|---|---|
| I | N | Z | V | C |

CCR

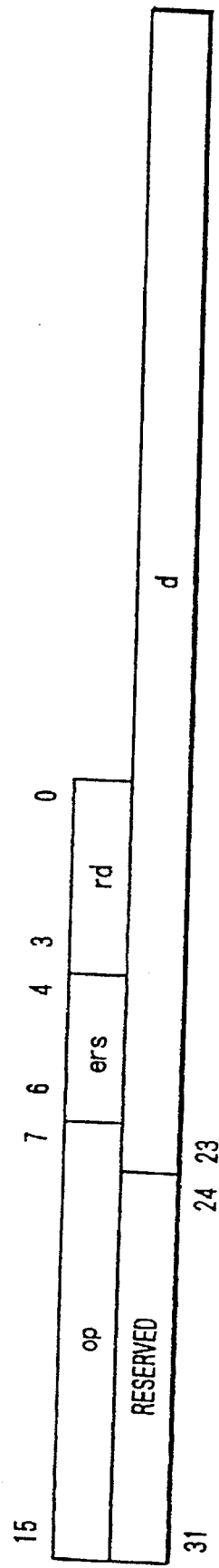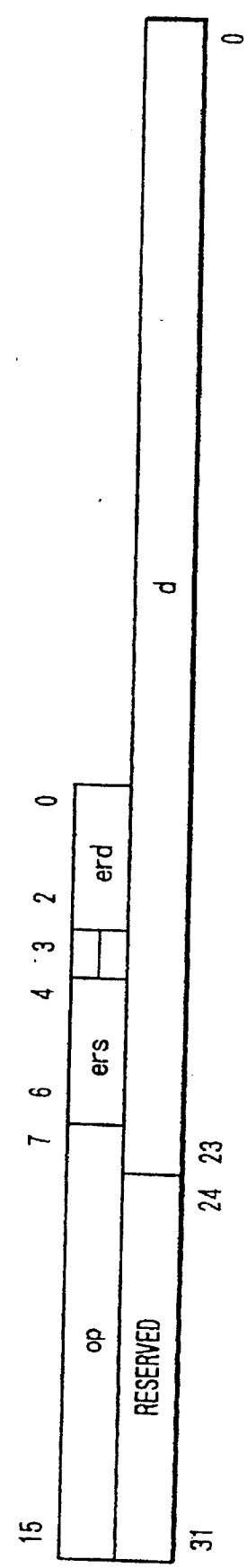

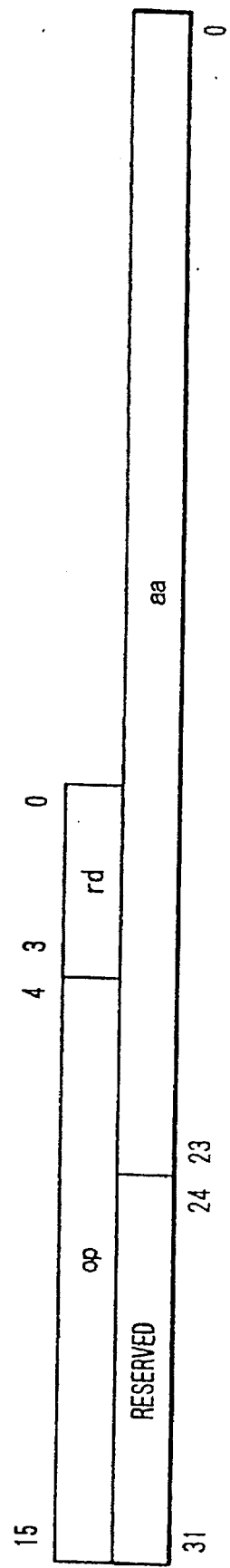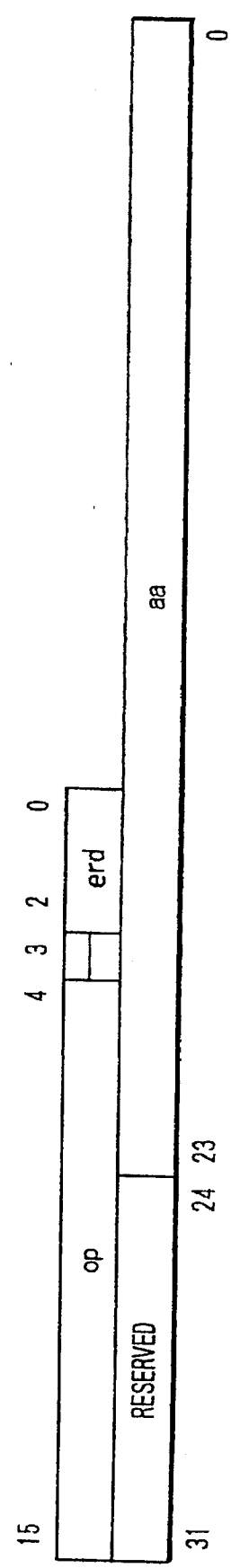

FIG. 17

| REGISTER FIELD OF THE INSTRUCTION CODES | DATA REGISTER | | | ADDRESS REGISTER |
|---|---|---|---|---|
| | BYTE SIZE | WORD SIZE | LONG WORD SIZE | |
| 0000 | R0H | R0 | ER0 | ER0 |
| 0001 | R1H | R1 | ER1 | ER1 |
| 0010 | R2H | R2 | ER2 | ER2 |
| 0011 | R3H | R3 | ER3 | ER3 |
| 0100 | R4H | R4 | ER4 | ER4 |
| 0101 | R5H | R5 | ER5 | ER5 |
| 0110 | R6H | R6 | ER6 | ER6 |
| 0111 | R7H | R7 | ER7 | ER7 |
| 1000 | R0L | E0 | — | — |
| 1001 | R1L | E1 | — | — |
| 1010 | R2L | E2 | — | — |
| 1011 | R3L | E3 | — | — |
| 1100 | R4L | E4 | — | — |
| 1101 | R5L | E5 | — | — |
| 1110 | R6L | E6 | — | — |
| 1111 | R7L | E7 | — | — |

FIG. 19

| | # | R | @R | @(d16,R) | @(d24,R) | @-R | @R+ | @a8 | @a16 | @a24 | @(d8,PC) | @(d16,PC) |
|---|---|---|---|---|---|---|---|---|---|---|---|---|
| DATA TRANSFER | Ⓑ Ⓦ L | Ⓑ Ⓦ L | Ⓑ Ⓦ L | Ⓑ Ⓦ L | B W L | Ⓑ Ⓦ L | Ⓑ Ⓦ L | Ⓑ | Ⓑ Ⓦ L | B W L | — | — |
| ADDITION OR SUBTRACTION | B W L | Ⓑ Ⓦ L | — | — | — | — | — | — | — | — | — | — |
| ADDITION OR SUBTRACTION WITH CARRY OR BORROW | Ⓑ | Ⓑ | — | — | — | — | — | — | — | — | — | — |
| SIGN INVERTION | | Ⓑ Ⓦ L | — | — | — | — | — | — | — | — | — | — |
| INCREMENT ±1 | | Ⓑ Ⓦ L | — | — | — | — | — | — | — | — | — | — |
| ±2 | | Ⓛ | — | — | — | — | — | — | — | — | — | — |
| DECREMENT ±4 | | L | — | — | — | — | — | — | — | — | — | — |
| LOGICAL OPERATION | Ⓑ Ⓦ L | Ⓑ Ⓦ L | — | — | — | — | — | — | — | — | — | — |
| SHIFT·ROTATE | | Ⓑ Ⓦ L | — | — | — | — | — | — | — | — | — | — |
| BIT MANIPULATION | | Ⓑ | Ⓑ | — | — | — | — | Ⓑ | — | — | — | — |

|  | VECTOR | SUB ROUTINE STACK | EXCEPTION-HANDLING STACK | @-R,@R+ RENEWAL OF EXPANSION REGISTER | MAXIMUM BIT NUMBER OF ADDRESS |
|---|---|---|---|---|---|
| MAXIMUM MODE | 4BYTE UNIT | PC 3BYTE+ 1BYTE (RESERVED) | PC 3BYTE+CCR | RENEW | 24BITS (16M BYTE) |
| MINIMUM MODE | 2BYTE UNIT | PC 2BYTE | PC 2BYTE+ RESERVED+CCR | NOT RENEW | 16BITS (64K BYTE) |

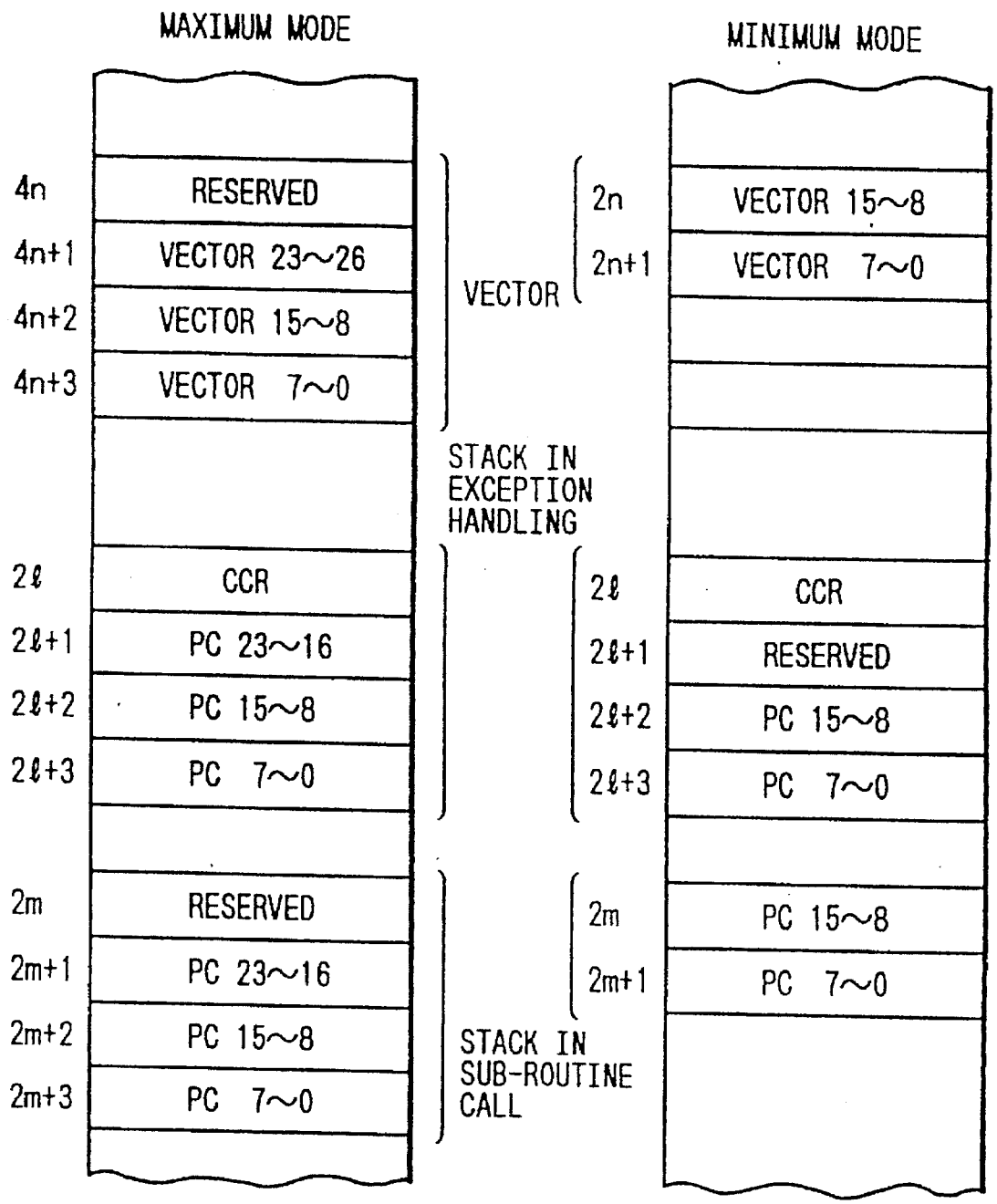

DATA PROCESSING DEVICE HAVING AN EXPANDABLE ADDRESS SPACE

This is a continuation of U.S. patent application Ser. No. 08/095,901, filed Jul. 22, 1993 now abandoned, which is a CIP of Ser. No. 07/877,890, filed Apr. 28, 1992, now abandoned.

CROSS-REFERENCE TO RELATED ART

The present invention is a continuation-in-part application Ser. No. 07/877,890 filed in the United States Patent and Trademark Office on Apr. 28, 1992, the disclosure of which is incorporated by reference.

BACKGROUND OF THE INVENTION

The present invention relates to a data processing device and, more particularly, to a technology which is effective if applied to a central processing unit of a single-chip microcomputer.

The single-chip microcomputer is classified into microcomputers of 4 bits, 8 bits and 16 bits in accordance with the data length which is handled mainly by their central processing units (as will be shortly referred to as "CPU"). Of these, the 8-bit single-chip microcomputer is most frequently used at present and is packaged to control a device. This 8-bit single-chip microcomputer is exemplified by H8/330 HD6473308 HD 6433308 Hardware Manual Hitach Ltd., published August 1989, the English version of which correspondes to Hitachi Single-Chip Microcomputer H8/330 HD6473308, HD6433308 Hardware Manual, 1st Edition, December 1989. The central processing unit of the 8-bit single-chip microcomputer (as will be called the "8-bit CPU") has a data length of 8 bits to be mainly handled so that the 8-bit CPU has a register or accumulator having a length of 8 bits and a register of 16 bits having a length twice as long as that of the 8-bit register. This 8-bit CPU uses mainly the 8-bit register or the register of 16 bits mainly for processing data and only the 16-bit register as an address register for referring to a memory, although not especially limitative thereto. The 16-bit register as such address register may be called the "index register", "stack pointer" or "program counter".

The aforementioned 8-bit CPU is given 16 bits (i.e., 2 bytes) as its minimum unit of instruction. On the other hand, in case an instruction or data of 16 bits is to be arranged in the memory, it is so limited that it is arranged in an area of 2 bytes continuing from an even number. Moreover, the operation instruction of the aforementioned 8-bit CPU is made effective only between the registers in the CPU, and the data arranged in the memory have to be manipulated in response to the operation instruction after they have been once transferred to the register in the CPU. Despite of this limit, the internal construction of the CPU, i.e., the construction of the control unit for controlling the execution of the CPU is simplified to realize a reduction in the logical and physical scales. This reduction in the logical and physical scales is effective to reduce the manufacture cost. As a secondary effect, it is possible to improve the operation speed. In other words, a relatively high processing performance can be realized at a relatively low manufacture cost.

SUMMARY OF THE INVENTION

In the aforementioned CPU, however, the address register has a length of 16 bits, and the memory to be referred to by the CPU has a capacity of 65,536 bytes ($=2^{16}$ or 64 Kbytes). In the application of the on-chip control using the 8-bit single-chip microcomputer, on the other hand, the high performance of a device requires large-capacity programs or data to be handled. At this time, moreover, the function is desired to have an upper compatibility with the aforementioned conventional CPU. In other words, the user can desirably utilize the source programs or object programs which are already developed for the conventional CPU, wholly or partially as they are. If either the peripheral function of the microcomputer or the portion depending upon an application system is then modified, the software or the application system can be promptly developed for a shortened time period.

For these demands, we have investigated a CPU which can refer to a memory of 64 Kbytes or more while reducing the logical/physical scales of the aforementioned CPU and realizing a relatively high processing performance at a relatively low manufacture cost.

On the contrary, the single-chip microcomputer, which is enabled to refer to a memory of 16,777,216 bytes ($=2^{24}$ or 6 Mbytes) by adding a page register of 8 bits to the 8-bit CPU and combining it with the 16-bit register to generate addresses, is exemplified by H8/532 HD6475328 HD6435328 Hardware Manual Hitachi Ltd., published December 1988, the Engilish version of which correspondes to Hitachi Single-Chip Microcomputer H8/532 HD6475828 and HD6485828, Hardware Manual, 1st Edition, August 1989. According to this memory referring method, the page register and the address register are absolutely independent of each other so that the method of realizing the hardware can be simplified. On the other hand, neither the carry nor the borrow is transferred between the page register and the address register so that care should be always taken to prevent a series of programs or data from trespassing across the page boundary, in case the program or compiler is to be made. For example, if the instruction is executed from a 0-th address in the aforementioned example, the program counter is H'0000 (H' designates a hexadecinormal notation), the corresponding page register (as will be called the "code page register") is H'00. The operation instruction and so on are continuously executed Without using any branch instruction, and the 65535 (H'FFFF) address is reached. If a next instruction is then executed, the program counter overflows H'FFFF→H'0000. Since the carry at this time is not transferred to the code page register, the next instruction is returned to the 0-th address. Therefore, the program has to be prepared in such a fragmentation as not to exceed 64 Kbytes, and these fragmented programs are assigned to different pages. If the execution is shifted from a program existing in a page from a program existing in another page, it is necessary to use an inter-page branching instruction. In other words, in case the branch instruction is used in a program, the in-page branching instruction and the inter-page branching instruction have to be properly used while being convinced whether the branching destination is present in a common page or another page. The data also have to be fragmented not to exceed 64 Kbytes and administered. Specifically, in case the content of the address register is renewed each time of accessing the memory as in the mode of the so-called "post-increment register indirect", no carrier is transferred like above to the corresponding page register (as will be called the "data page register") even if the address register overflows. On the other hand, in case a displacement of 16 bits is used in the register indirect with displacement, the displacement of 16 bits is added to the address register of 16 bits, and the carry or borrow, if any, will not be transferred to the page register so that the added result of 16 bits and the page register are combined to produce addresses. Specifically, in case of the page register H'00, the address register H'FFFF and the displacement H'4000, the resultant address is one expressed by H'003FFF. Therefore, even the substantially usable addressing mode is limited in the address expansion technology utilizing the page register.

This administration of the page register, in which care is always taken for the program or data not to trespass across the page boundary raises a serious restriction upon the compiler for automatically translating the content programmed by using the so-called "high-level languages" into the program (i.e., object program) of the CPU according to the so-called "machine languages". As a result, the design efficiency of the compilers is degraded to drastically enlarge the scale of the object program to be made, thereby to reduce the execution time period of the program.

For a sufficient application by a memory space of 64 Kbytes or less, moreover, the aforementioned page register becomes logically and physically wasteful because it cannot be used as the data register, while being contrary to the aforementioned object of realizing a relatively high processing performance at a relatively low manufacture cost.

An object of the present invention is to provide a data processing device capable of widening a continuously usable address space relatively while minimizing the increase in the logical/physical scales and while realizing the upper compatibility with the low-order CPU, in which the program already developed for another data processing device such as the low-order CPU can be partially or wholly utilized. The relatively widening of the continuously usable address space is that the address space of 64 Kbytes or more can be continuously used by using the 8-bit CPU, for example.

Another object of the present invention is to provide a data processing device which makes it possible to compile the program made in the high-level languages.

The aforementioned and other objects and the novel features of the present invention will become apparent from the following description to be made with reference to the accompanying drawings.

The representative of the invention to be disclosed will be briefly described in the following.

Specifically, the general registers of the CPU (central processing unit) can be utilized for latching data information by using all of them, by halving them or by further halving one of the halves, and for latching address information with a larger bit number than the address bit number of the low-order CPU. For example, the registers of total 32 bits are used wholly or partially as address registers such that the expansion registers of 16 bits are added to the general registers of 16 bits of the CPU of 8 bits, and the data registers are halved at the unit of total 32 bits into two data registers of 16 bits, one of which is further halved into two registers of 8 bits. This register utilizing mode is specified, as follows. Whether the registers are to be used as the 8-bit ones or the 16-bit ones is determined by the size bit of the data information included in the operation code. When the data information has a size of 8 bits (i.e., 1 byte), the high-order and low-order of the 8-bit registers are specified by the predetermined 1 bit of the register specifying field included in the instruction. When the data information has a size of 16 bits (i.e., 1 word), said predetermined 1 bit specifies the high-order and low-order of the 16-bit registers. Moreover, the utilization as the 32-bit (long word) registers is specified by the prefix code of the instruction including the operation code. Alternatively, a new operation code having the same bit number as that of the operation code of the low-order CPU is additionally specified. On the basis of this register construction, the instruction executing function of the low-order CPU having the 16-bit register is included. As a result, the program developed for the low-order CPU can be utilized at least at the level (i.e., the descriptive level in the high-level languages) of the source program by the high-order CPU according to the present invention. In other words, the upper compatibility is realized at least at the source program level. Here, the low-order CPU is defined as the CPU which has its register construction and instruction set included in the register construction and instruction set of the data processing device such as the CPU according to the present invention.

In order to realize the upper compatibility at the object program level, there may be prepared the maximum mode and the minimum mode, that is, the operation modes for switching the bit number of effective addresses and the unit sizes of a vector and a stack in accordance with the using modes of the aforementioned registers. In the minimum mode, the CPU operates absolutely like the low-order CPU. In the maximum mode, the CPU operates as the high-order CPU with its maximum functions.

The aforementioned prefix code has to have no superposition with the instruction code of the low-order CPU and is optimized to one corresponding to a code of an undefined instruction.

The unit of the instruction can be made twice as long as that of the data information. When the register of the CPU is extended to 32 bits, for example, the 24-bit absolute address with displacement is given 4 bytes including a reserved area by setting the instruction length at the unit of 2 bytes if the use of the address space of 4 Gbytes in the future is considered. In order to simplify the constructions of the execute means and the control means thereby to contribute to the reduction of the logical and physical scales, moreover, it is desired that the least significant bit of the effective address specifying portion in the instruction code be the least significant bit of the word in the instruction code.

According to the means described above, the data information can be latched in a halved manner, and the upper compatibility at least at the source program level is realized: by adopting the register construction which can also be utilized as the address register with a bit number more than the address bit number of the low-order CPU; by specifying the byte/word sizes of the data information with the size bit of the operation code; by specifying the utilization of the data information having a long word size by the prefix code or the operation code to which is newly added the same bit number as that of the low-order CPU; by specifying the high-/low-order of the byte size register to be used for the data information of byte size by predetermined 1 bit of the register specifying field; and by specifying the high-/low-order of the word size register by predetermined 1 bit of the word size data information.

The preparation of the aforementioned maximum mode and minimum mode realizes the upper compatibility at the object program level.

The register construction, which is made wholly of 32 bits by adding the 16-bit expansion registers to the 16-bit general registers of the 8-bit CPU, improves the usability of the data latch means on the software and hardware to achieve a reduction of the logical and physical scales of the data processing device such as the CPU. As to the latch of the address data using the entirety or a portion of the data latch means, moreover, the address space to be linearly utilized is easily expanded, and it is more easy to make and compile the program than the address space expanding technology resorting to the page register.

BRIEF DESCRIPTION OF THE DRAWINGS

FIG. 2 is an explanatory diagram of an example of a register construction of a low-order CPU;

FIG. 4 is an explanatory diagram showing a register construction of the CPU according one embodiment of a data processing system according to the present invention;

FIGS. 12A and 12B is an explanatory diagram showing a further example of an instruction format of the CPU according to the present embodiment;

FIGS. 14A and 14B is an explanatory diagram showing a further example of an instruction format of the CPU according to the present embodiment;

FIG. 17 is an explanatory diagram showing a mode for specifying the register shown in FIG. 4;

FIG. 19 is an explanatory diagram showing a combination the instructions of the CPU according to the present embodiment and the addressing mode;

Figures 20A, 20B:
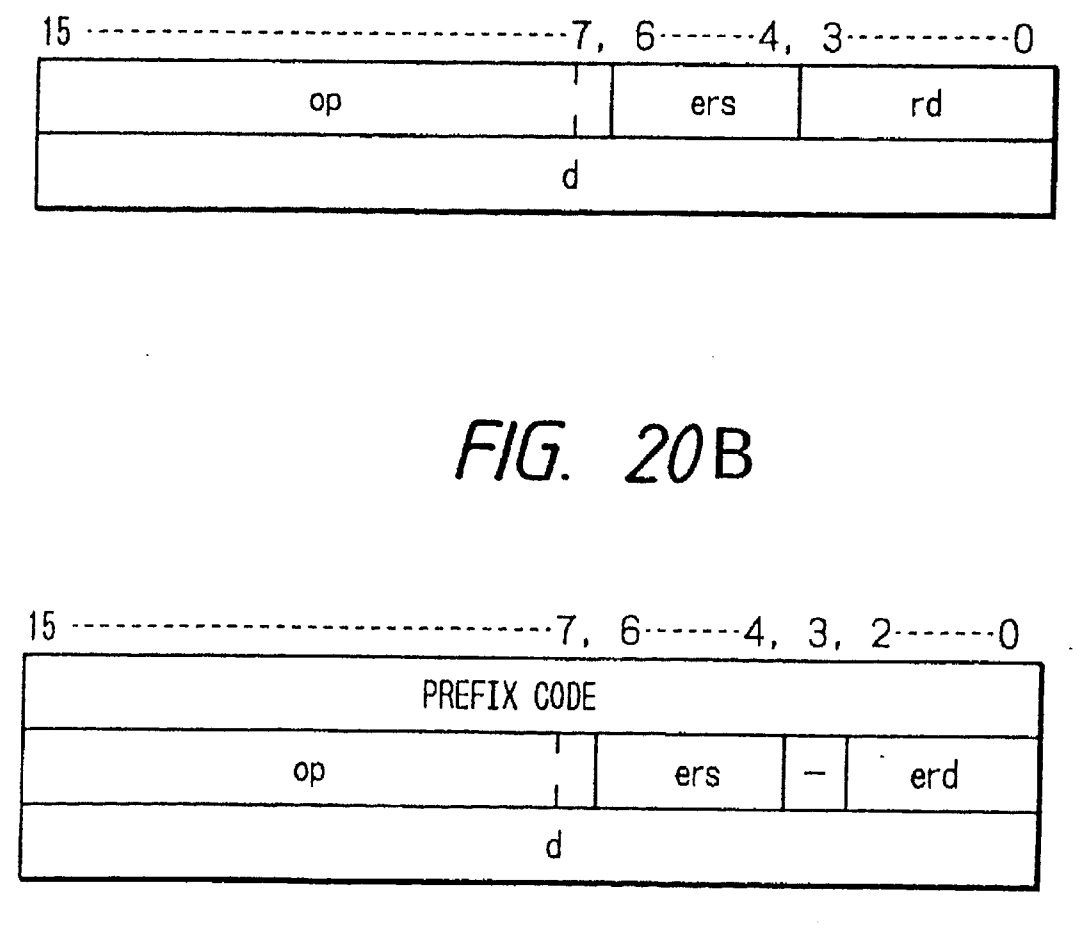

FIGS. 20A and 20B is an explanatory diagram showing an instruction format utilizing a prefix code;

FIG. 23 is an explanatory diagram showing the differences between the operations of the CPU in the minimum mode and in the maximum mode; and FIGS. 24A and 24B is an explanatory diagram showing the differences between the data types on a memory in the minimum mode and in the maximum mode.

DESCRIPTION OF THE PREFERRED EMBODIMENT

Figure 1:
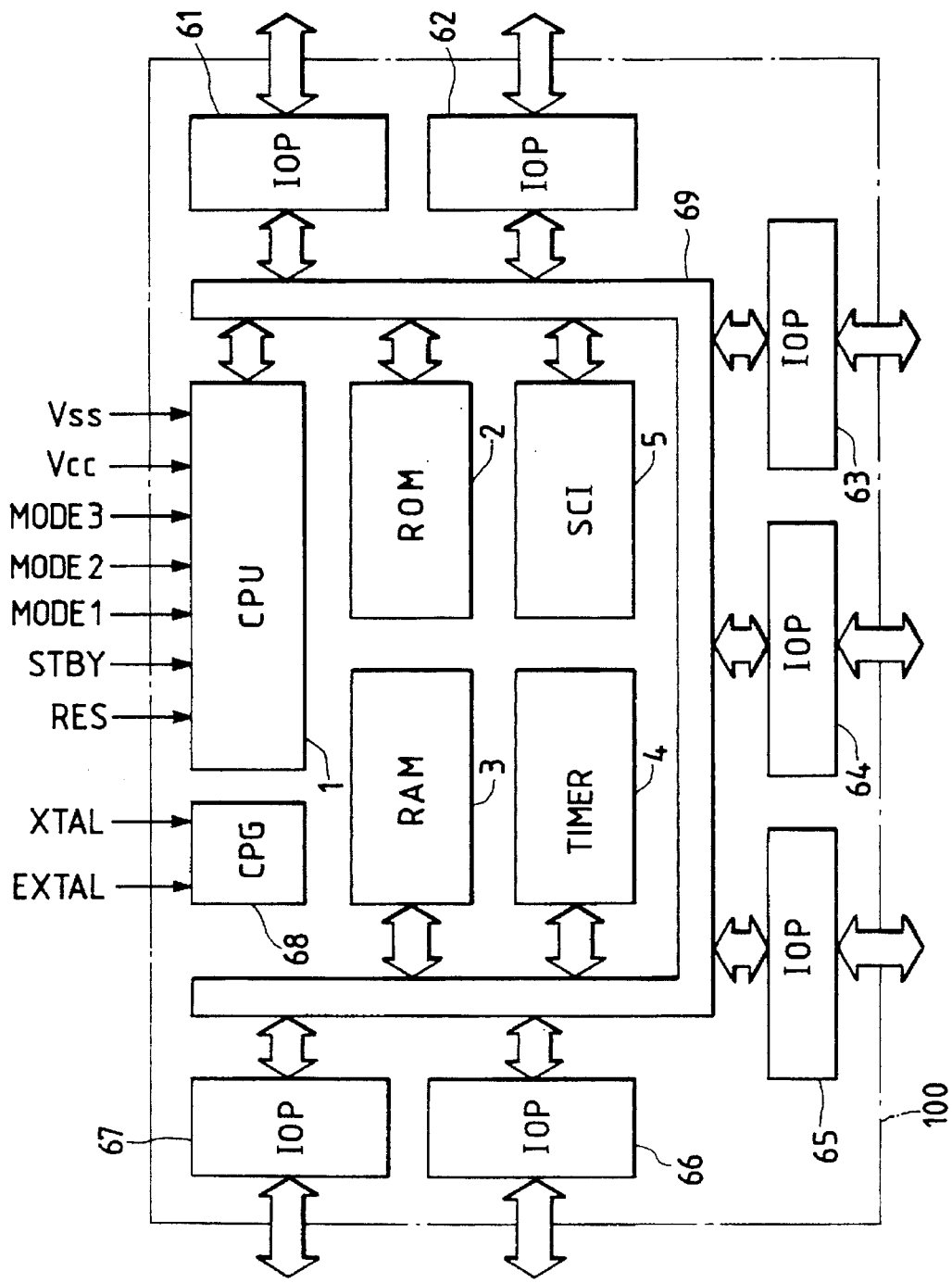
FIG. 1 is a block diagram showing a single-chip microcomputer according to one embodiment of the present invention.

FIG. 1 shows a single-chip microcomputer or one embodiment of a data processing device (system) according to the present invention. The single-chip microcomputer, as designated at 100 in FIG. 1, is constructed functional blocks including: a CPU (i.e., Central Processing Unit) 1 for controlling the entirety; a ROM (i.e., Read Only Memory) 2 storing the operation programs of the CPU 1; a RAM (i.e., Random Access Memory) 3 used as a work area of the CPU 1 and a temporary storage of data; a timer 4; a serial communication interface (SCI) 5; a clock pulse generator 68; and input/output ports (IOP) 61 to 67. These blocks are mutually connected by an internal bus 69. This internal bus 69 includes an address bus, a data bus and a control bus. The single-chip microcomputer 100 thus constructed is formed over one semiconductor substrate such as a silicon substrate by the well-known semiconductor integrated circuit manufacture technology.

The single-chip microcomputer 100 operates in synchronism with either a quartz oscillator connected with terminals XTAL and EXTAL of a clock pulse generator CPG or the reference clock which is produced on the basis of an external clock inputted from the outside. This reference clock has a minimum unit called "state". Incidentally, letters Vss and Vcc appearing in FIG. 1 designate power terminals. Letters MODE1 to MODE3 designate mode signals for the CPU 1.

When a reset signal RES is fed to the CPU 1, the single-chip microcomputer 100 is reset. The CPU 1 reads a start address, when released from the reset state, to perform a reset exceptional operation for starting the read of an instruction from the start address. This start address is stored at a 0-th address, although not especially limited thereto. After this, the CPU 1 reads and decodes instructions sequentially from the ROM 2 so that it either processes the data on the basis of the decoded results or transfers the data to and from the RAM 3, the timer 4, the SCI 5 and the input/output ports 61 to 67. Specifically, with reference to either the data inputted from the input/output ports 61 to 67 or the instructions from the SCI 5 or the like, the CPU 1 processes on the basis of the instruction stored in the ROM 2, and uses the input/output ports 61 to 67 and the timer 4 on the basis of the processed result to output its signals to the outside thereby to control a variety of devices. Although not especially limitative, the read/write of the ROM 2, the RAM 3 and the timer 4 are executed at two states of byte (i.e., 8 bits)/word (i.e., 16 bits).

The CPU 1 thus constructed is given the minimum unit of 2 bytes, and the instructions or 16-bit data are arranged in the memory in the continuous area of 2 bytes beginning from an even number.

FIG. 2 shows an example of a CPU register construction corresponding to a CPU low-order to the aforementioned CPU 1. The low-order CPU in the present embodiment is one which has been provided before the CPU 1 has been developed. In other words, the CPU 1 according to the present embodiment can be positioned as an up-version of the low-order CPU.

The low-order CPU shown in FIG. 2 includes: eight general registers R0L and R0H to R7L and R7H each having a length of 16 bits; a program counter PC having a length of 16 bits; and a condition code register CCR having a length of 8 bits. The general registers R0L and R0H to R7L and R7H can store the 8-bit length data either by making the more significant 8 bits and the less significant 8 bits independently or by connecting the more and less significant bits, although not especially limited thereto. The condition code register CCR is composed of an interrupt mask bit (I), a carry flag (C), a zero flag (Z), a negative flag (N) and an overflow flag (V). The interrupt mask bit I brings the CPU 1 into an interrupt inhibiting state, when at 1, and the same into an interrupt permitting state, when at 0. The remaining flags reflect the results of arithmetic operations.

Figure 3:
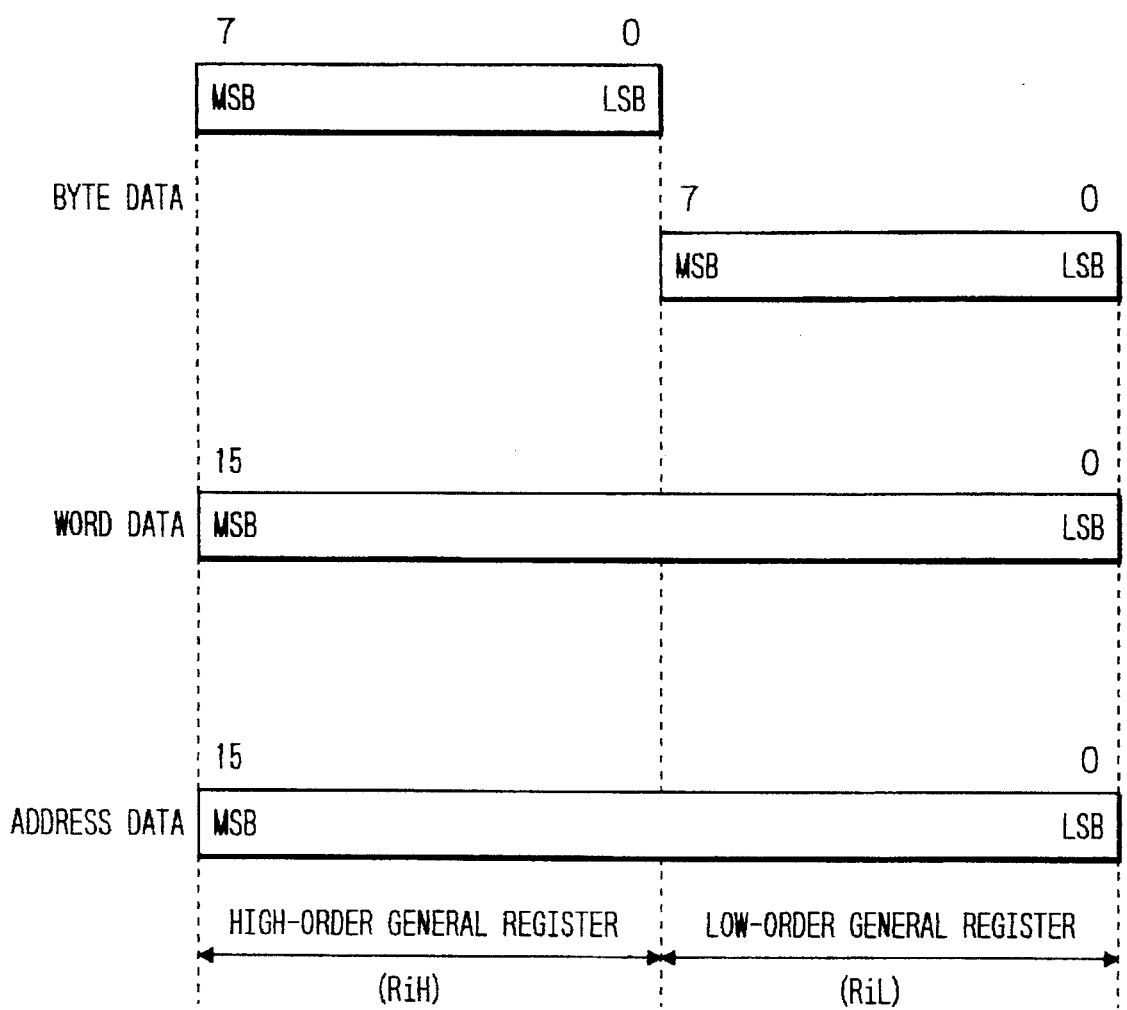
FIG. 3 is an explanatory diagram showing a data construction of a general register of the CPU of FIG. 2.

FIG. 3 shows the data to be used in the register construction of FIG. 2.

The byte data to be handled by the low-order CPU are stored like before in the high-order one RiH or the low-order one RiL of the general registers (wherein i=0 to 7). The bit 15 corresponds to the most significant bit, and the bit 0 corresponds to the least significant bit. The address information (or address data) is stored as word data in the general register Ri. The bit 15 corresponds to the most significant bit of the data, and the bit 0 corresponds to the least significant bit. Eight 16-bit registers and sixteen 8-bit registers can be used. Which the size of the data is defined by byte or word is determined by the size bit of 1 bit included in the operation code of an instruction.

FIG. 4 shows an example of a register construction of the CPU 1 as a high-order CPU according to one embodiment of the present invention.

The CPU 1 is constructed to include: eight general registers R0L and R0H to R7L and R7H each having a length of 16 bits; eight expansion registers E0 to E7 each having a length of 16 bits; a program counter PC having a length of 24 bits; and a condition code register CCR having a length of 8 bits. The general registers R0L and R0H to R7L and R7H can store the 8-bit length data either by making the more significant 8 bits and the less significant 8 bits independently or by connecting the more and less significant bits, although not especially limited thereto. The expansion registers Ei cannot be separated and used independently of one another.

In case the general registers RiL and RiH are to be used as address registers, total 32 bits are generated by using the 16 bits of the general registers RiL and RiH as the less significant 16 bits of the address and by using the content of the corresponding expansion registers Ei as the more significant 16 bits of the address, or an address of 24 bits is generated by ignoring the more significant 8 bits of the expansion registers Ei. The CPU 1 can utilize a continuous address space which is specified by the address of 24 bits or 32 bits. Moreover, this address of 32 bits or 24 bits can be modified in various manners. In case of these modification, the expansion register Ei at a high-order side is carried or borrowed, if necessary. Incidentally, the address data are set to have 24 bits in the following description. Accordingly, the program counter PC of FIG. 4 is given a bit length of 24 bits. The program counter PC may be given a bit length of 32 bits.

The expansion registers E0 to E7 can be used as data registers of 16 bits like the general registers. In other words, the data can be operated between the expansion registers and between the expansion registers and the general registers. Incidentally, the condition code register CCR is similar to the aforementioned one, and its detailed description will be omitted. The program counter PC is similar to the aforementioned one excepting the bit length.

Figure 5:
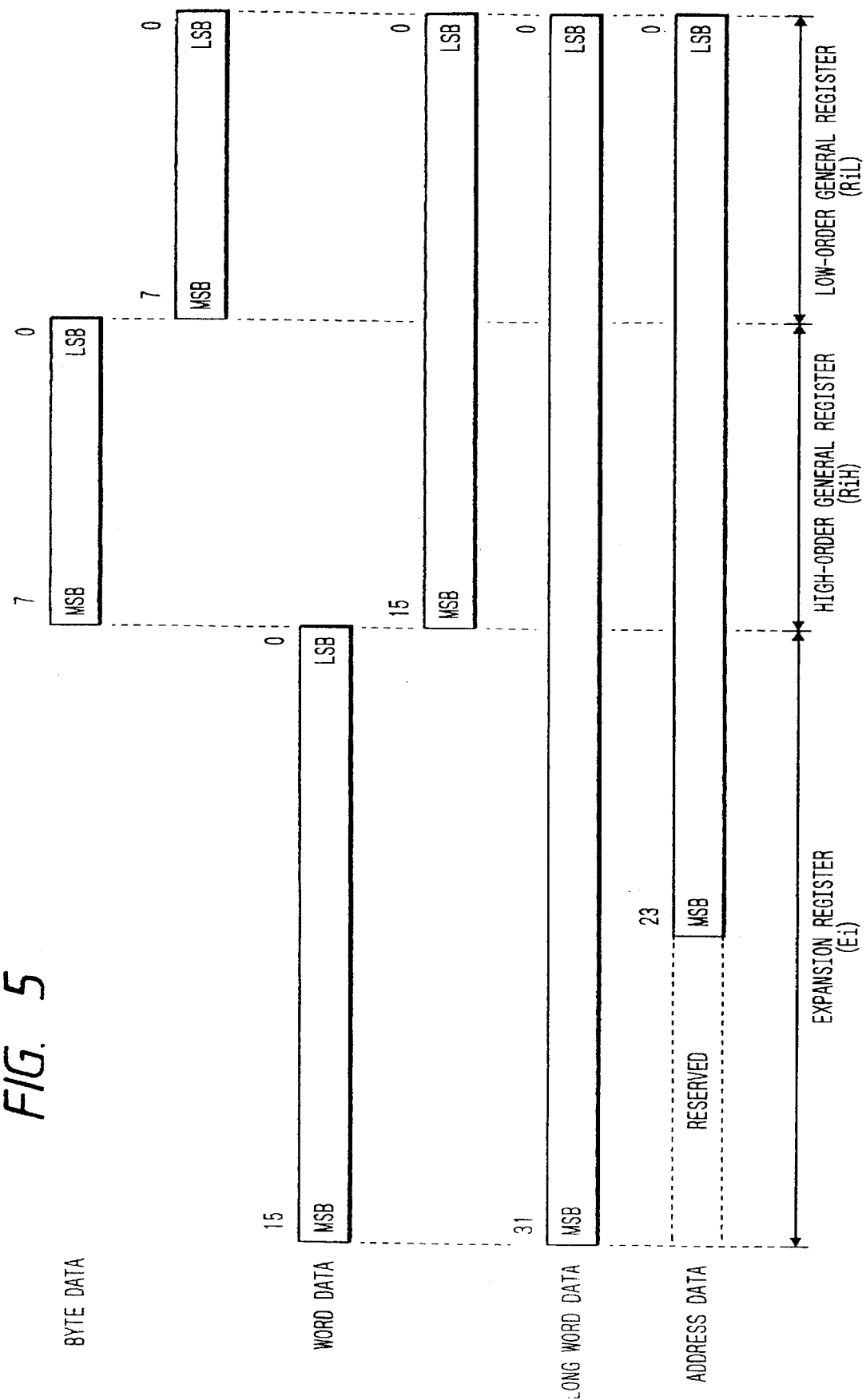
FIG. 5 is a diagram showing a data construction on a register of the CPU according to the present embodiment.

FIG. 5 shows an example of the data of the general registers R0L and R0H to R7L and R7H and the expansion registers E0 to E7. The byte data to be handled by the CPU 1 are stored the high-order general registers RiH (i=0, 1, - - -, and 7) or the low-order general registers RiL. The word data are stored in the general registers Ri (RiH, RiL) or the expansion registers Ei. At this time, the bit 15 corresponds to the most significant bit of the data, and the bit 0 corresponds to the least significant bit. The long word data of 32 bits are stored in the general registers Ri and the expansion registers Ei. The address data of 24 bits are stored as the long word data in the expansion registers Ei and the general registers Ri. At this time, the more significant 8 bits of the expansion registers Ei are a reserved area. Incidentally, the address data of reserved 8 bits and the address data of 24 bits are called together merely as the long word address data.

According to this register construction, it is possible to use sixteen 8-bit registers, sixteen 16-bit registers and eight 24-bit registers. This means that there is an upper compatibility with the aforementioned low-order CPU, and that the software made by using the registers belonging to the low-order CPU can be utilized with at least the source program level by the aforementioned CPU 1. In order to realize the high-order compatibility of the CPU 1 with the low-order CPU, it has to be common how to specify the registers. As will be described in detail, only the register number may be considered as the address registers, the specification of the registers in the register specifying field of the instruction can be performed at 4 bits for either operations of 8 bits and 16 bits so that the instruction format can be shared with the low-order CPU. Moreover, since 4 bits are used for specifying sixteen registers, no waste arises. In this respect, the register construction will not deteriorate the object to simplify the internal construction of the CPU 1 to reduce the logical/physical scale thereby to reduce the cost for the manufacture and to improve the operation speed.

FIGS. 6A–6C, 7A–7C, and 8A–8C show one example of a method for calculating the addressing mode and effective address of the CPU 1.

Figure 6A:
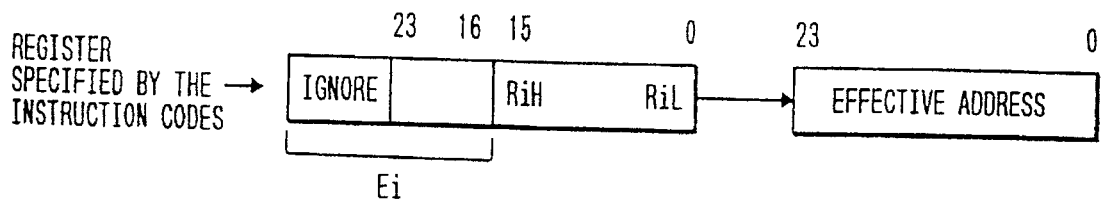
FIGS. 6A, 6B, and 6C is an explanatory diagram showing one example of an addressing mode and an effective address calculating method according to the CPU of the present embodiment.

In a register indirect, as shown in FIG. 6A, the instruction codes include a portion for specifying a register to specify the address on a memory by using as the address the total 24 bits of the contents of the register specified by the instruction codes and the corresponding expansion register. The more significant 8 bits are ignored because the 24 bits are sufficient for the address.

Figure 6B:
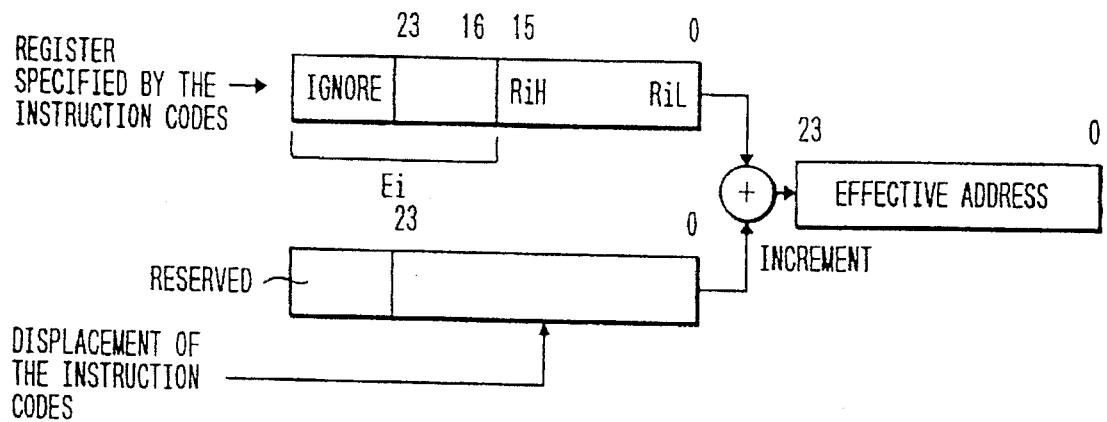
Figure 6C:
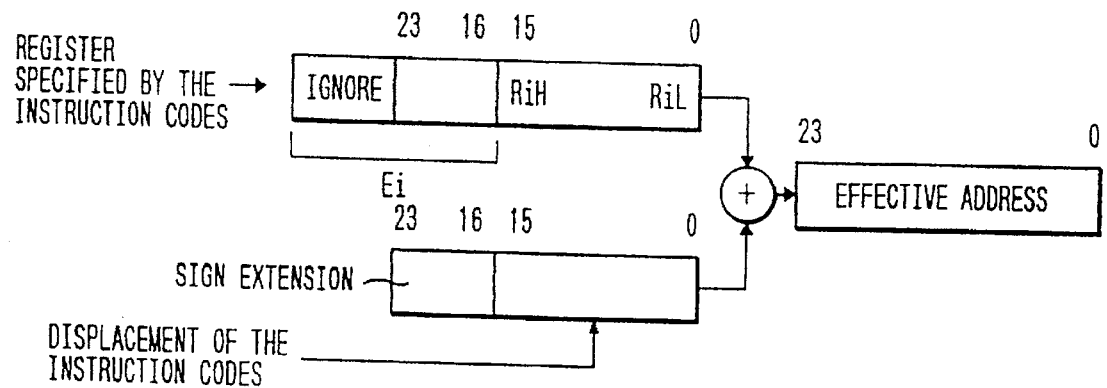

In a register indirect with displacement, as shown at in FIGS. 6B and 6C, the result of adding the address of 24 bits obtained as in the aforementioned register direct to the displacement included in the instruction codes is used as the address to specify the address on the memory. The added result is used only for specifying the address but not reflected upon the contents of the expansion registers Ei and the general registers Ri. Although not especially limitative, the displacement has 24 bits or 16 bits. In case the 16-bit displacement is to be added, the more significant 16 bits are subjected to a sign extension. In other words, the more significant 16 bits of the displacement are added assuming that they take a value equal to that of the bit 15 of the 16-bit displacement. In this case, the more significant 8 bits of the 24-bit displacement include, because the instruction has a unit of 2 bytes and for a future extension, the displacement specifying portion together with the reserved area in the instruction codes. The reserved area is subjected to the sign extension.

Figure 7A:
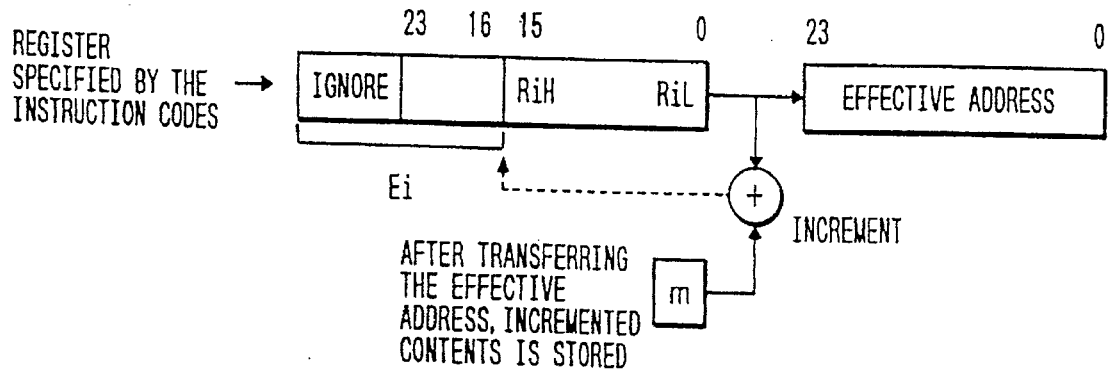
FIGS. 7A, 7B, and 7C is an explanatory diagram showing another example of an addressing mode and an effective address calculating method according to the CPU of the present embodiment.

In the register indirect with post increment, as shown in FIG. 7A, like the aforementioned register indirect, the address on the memory is specified by the address of 24 bits. After this, this address is incremented by 1, 2 or 4, and this incremented result is stored in the expansion registers and the general registers. The value 1 is incremented in case the byte data on the memory are specified; the value 2 is incremented in case the word data are specified; and the value 4 is incremented in case the address data are specified. The more significant 8 bits of the incremented result are also stored in the expansion registers.

Figure 7B:
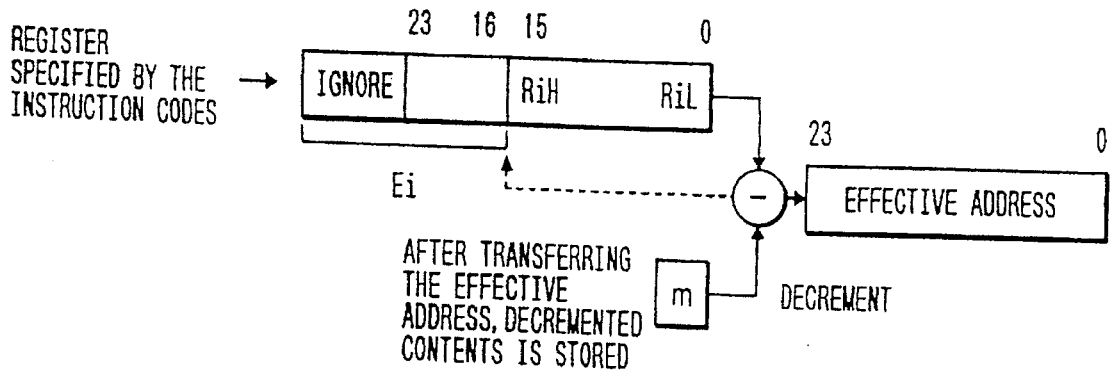

In the register indirect with pre-decrement, as shown in FIG. 7B, like the aforementioned register indirect, the address on the memory is specified by the address of 24 bits of the result of decrementing 1, 2 or 4 from the address of 24 bits. After this, the decremented result is stored in the expansion registers and the general registers. The value 1 is decremented in case the byte data on the memory are specified; the value 2 is decremented in case the word data are specified; and the value 4 is decremented in case the address data are specified. In case the address may take 24 bits, like before, the more significant 8 bits of the decremented result are also stored in the expansion registers.

Figure 7C:
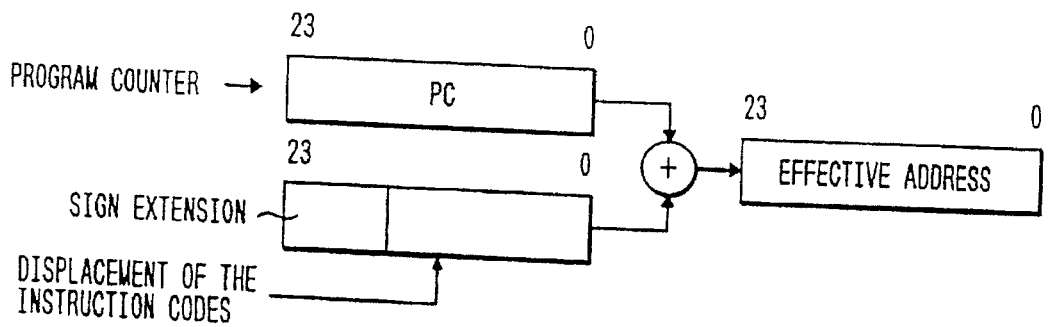
Figure 9A:
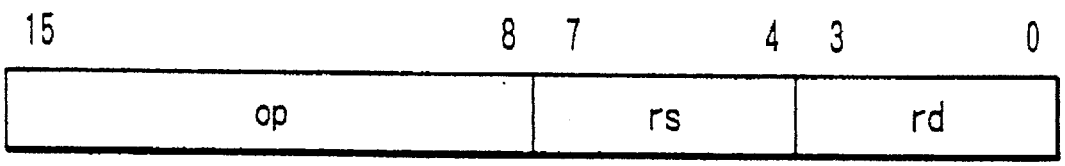
FIGS. 9A and 9B is an explanatory diagram showing one example of an instruction format of the CPU according to the present embodiment.
Figure 9B:
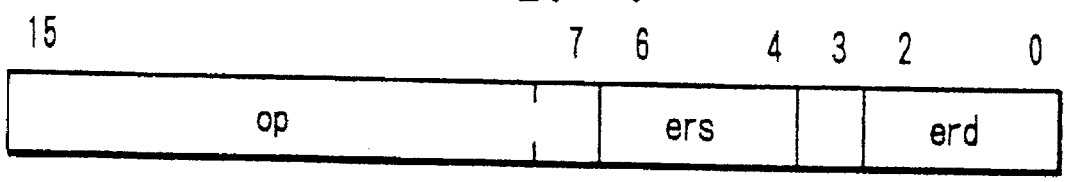
Figure 10A:
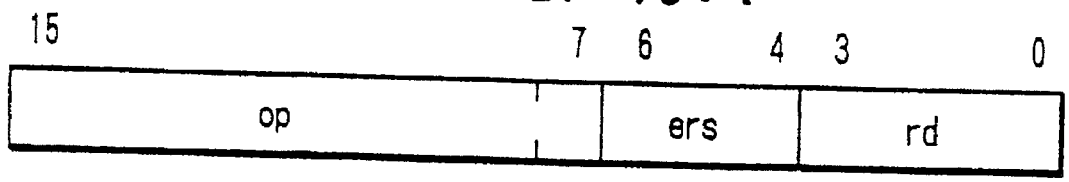
FIGS. 10A and 10B is an explanatory diagram showing another example of an instruction format of the CPU according to the present embodiment.
Figure 10B:
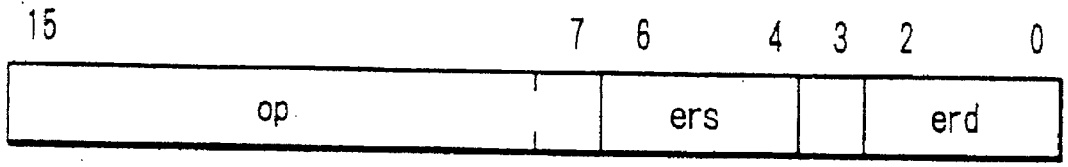
Figure 11A:
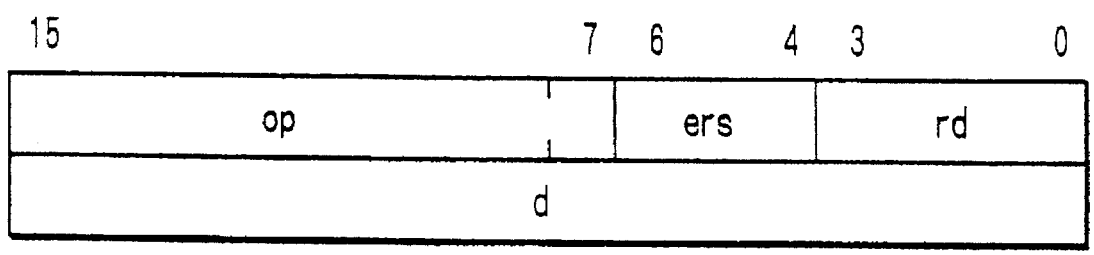
FIGS. 11A and 11B is an explanatory diagram showing still another example of an instruction format of the CPU according to the present embodiment.
Figure 11B:
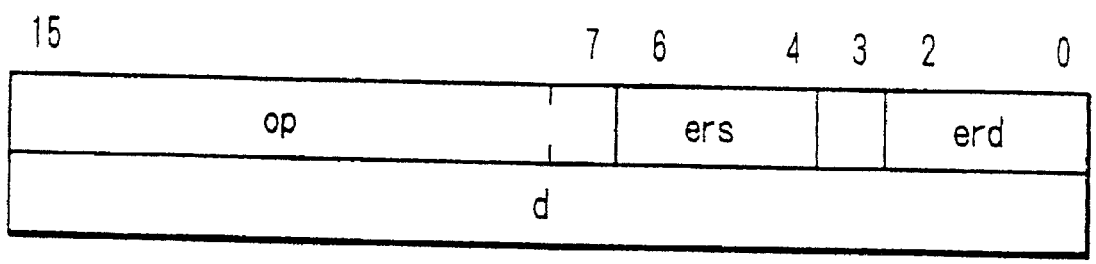
Figure 13A:
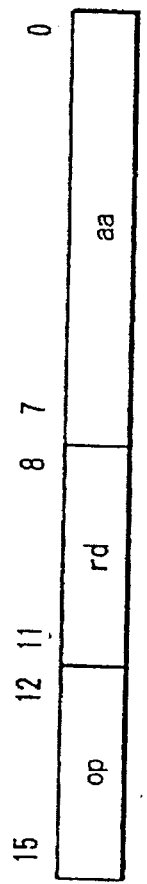
FIGS. 13A, 13B, and 13C is an explanatory diagram showing a further example of an instruction format of the CPU according to the present embodiment.
Figure 13B:
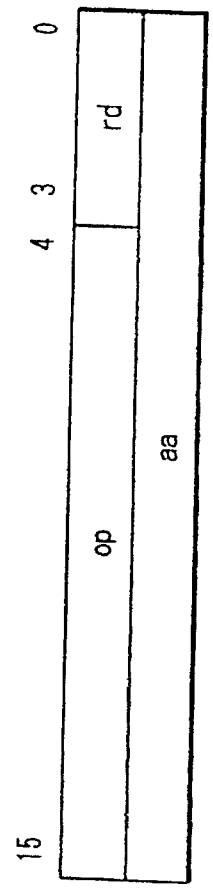
Figure 13C:
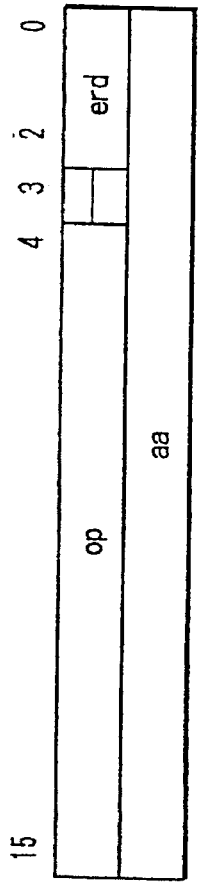
Figure 15A:
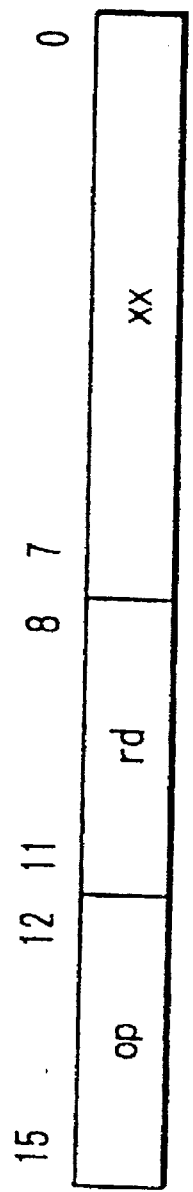
FIGS. 15A and 15B is an explanatory diagram showing a further example of an instruction format of the CPU according to the present embodiment.
Figure 15B:
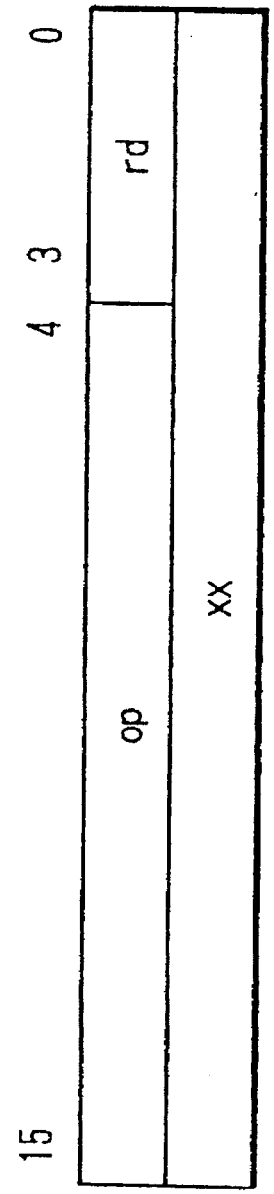
Figure 16A:
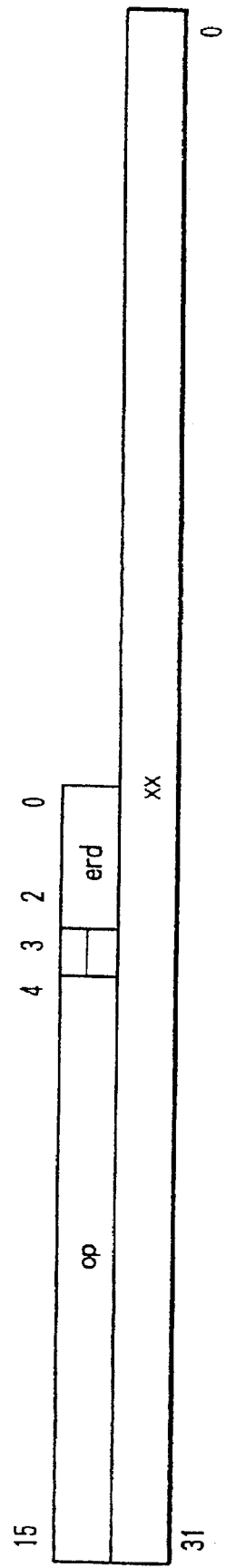
FIGS. 16A and 16B is an explanatory diagram showing the remaining portion of an instruction format of the CPU according to the present embodiment.
Figure 16B:
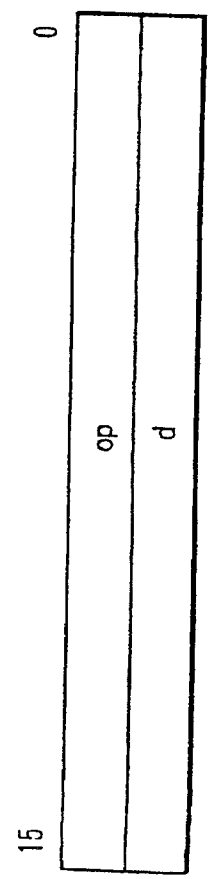

In the program counter relative, as shown in FIG. 7C, the address on the memory is specified by using as the address the added result of adding the displacement included in the instruction codes to the address of 24 bits of the content of the program counter. Although not especially limitative, the displacement takes 16 bits or 8 bits. In case this displacement is added, the more significant 8 bits or 16 bits are subjected to the code extension. Specifically, the additions are carried out by assuming that the more significant 8 bits of the displacement be equal to the bit 15 of the 16-bit displacement or that the more significant 16 bits be equal to the bit 7 of the 8-bit displacement. The program counter relative is used only in the branch instruction.

Figure 8A:
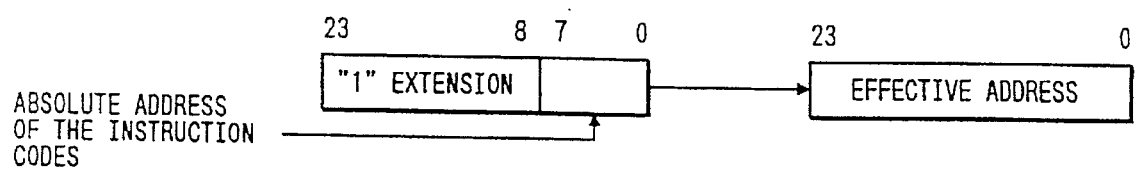
FIGS. 8A, 8B, and 8C is an explanatory diagram showing another example of an addressing mode and an effective address calculating method according to the CPU of the present embodiment.
Figure 8B:
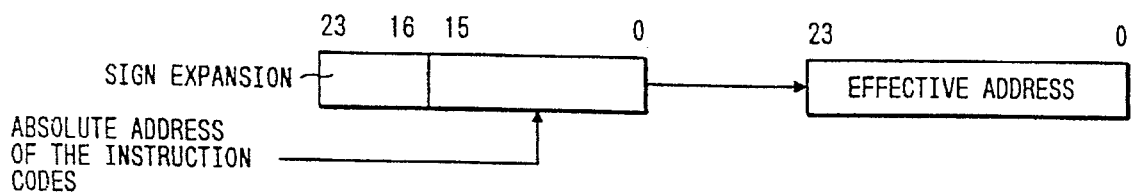
Figure 8C:
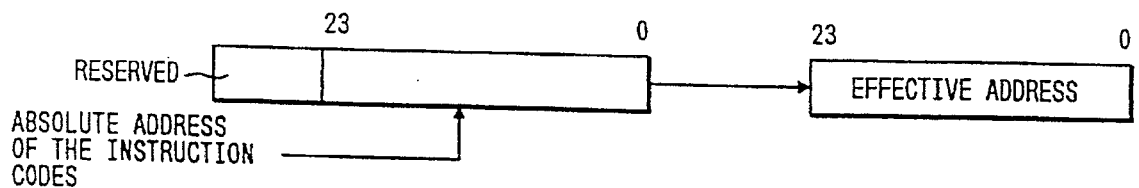

An absolute address, as shown in FIGS. 8A–8C, specifies the address on the memory by using as the address the absolute address of 8, bits, 16 bits or 24 bits included in the instruction codes. The absolute address of 8 bits has its more significant 16 bits subjected to a "1" extension. In other words, all the bits 23 to 8 of the address are set to "1". As a result, the usable address has 256 bytes of H'FFFF00 to H'FFFFFF. Moreover, the absolute address of 16 bits has its more significant 8 bits are subjected to the code extension. Specifically, if the absolute address of 16 bits has its bit 15 at 0, all the bits 23 to 16 of the address are set to 0. If the bit 15 is at 1, all the bits 23 to 16 of the address are set to 1. As a result, the usable address has 64 Kbytes of H'000000 to H'007FF and H'FF8000 to H'FFFFFF.

The CPU executes, in addition to the aforementioned operations, the addressing modes of immediate, register direct and so on, which have no direct relation to the present invention so that their detailed description will be omitted.

Since the low-order CPU has an address space of 64 Kbytes, it has neither any register indirect with displacement of 24 bits nor any absolute address of 24 bits. Nor is present any long-word size such as the register indirect with pre-decrement. The remaining addressing modes, as shown in FIGS. 6A–6C, 7A–7C, and 8A–8C, can be deemed as identical to the addressing modes supported by the low-order CPU and the effective address calculations, if the more significant 8 bits of the address information are ignored. Therefore, the CPU 1 also has a functional compatibility with the low-order CPU and the conventional CPU in the addressing mode and in the address calculations.

FIGS. 9A, 9B, 10A, 10B, 11A, 11B, 12A, 12B, 13A–13C, 14A, 14B, 15A, 15B, 16A, and 16B show instruction formats in the major addressing modes.

Each instruction format has an operation code op for indicating the function and addressing mode of each instruction and includes register specifying portions (rs, rd, ers, erd) for specifying a register to be used in accordance with the operation code of the operation code portion op, an absolute address (aa), a displacement (d) or an immediate (xx). The instruction format has a unit of 2 bytes, and the register specifying portion is included in the bit 7 to bit 4 or the bit 3 to bit 0 of the first word of the instruction code or in the bit 11 to bit 8 in a special form. The register specifying portion rs specifies a source register having a byte or word size, and the register specifying portion rd specifies a destination register having a byte or word size. The operation code (ex. size bit) of the operation code portion determines whether the register to be specified is used as the byte size or the word size. Specifically, in case of following the operation code accompanied by operations of 16 bits, the less significant 3 bits of the register specifying portions rs and rd specify one of the eight registers R0 to R7, and the remaining more significant 1 bit of the same register specifying portions specifies which of the expansion register or the general register of the specified register is to be utilized. In case of following the operation code accompanied by operations of 8 bits, the less significant 8 bits of the register specifying portions rs and rd specify one of the eight registers R0 to R7, and the remaining more significant 1 bit of the same register specifying portions specifies which of the high-order or low-order general register of the specified register is to be utilized. The register specifying portion ers specifies a source register having a long word size, and the register specifying portion erd specifies a destination register having a long word size. The most significant 1 bit of the register specifying portions ers and erd having 4 bits reserved is substantially ignored at an instruction decoding time. In this case, it is clarified by an operation code, if can be newly added especially for using long word data, that the register specifying with a substantially significant 3 bits has 32 bits. In case such new operation code cannot be added or in case it is decided that the addition has no merit, a prefix code is utilized, as will be described hereinafter. Here, the bit number of the operation code especially for utilizing the long word data is equal to that of the operation code of the low-order CPU.

The absolute address .aa, the displacement d and the immediate xx in the instruction format are so included in the instruction code that the least significant bit is an even bit 0. In other words, the absolute address aa, the displacement d and the immediate xx of 16 bits or more are included at the unit of 2 bytes. As a result, the absolute address aa and the displacement d of 24 bits are given 4 bytes while including a reserved portion of a predetermined bit number in its leading (or more significant) 1 byte. The absolute address aa, the displacement d and the immediate xx of 8 bits are included in the bits 7 to 0 of a first word.

According to the instruction format described above, the portion in the instruction format for specifying a register is fixed in one portion of the first word of an instruction so that the instruction decoding logic construction is simplified. Moreover: what of the eight registers is specified is determined by the less significant 3 bits of the register specifying area; what area of one specified register is used is determined by the more significant 1 bit; and the size of the area to be determined by said 1 bit is determined in terms of the data size specified in the instruction, i.e., the operation code of the operation code portion. As a result, the number of bits of the register specifying portion can be minimized even if the data to be stored in the registers and the address data are of several kinds of bytes, words and long words.

Like before, the low-order CPU does not have the register indirect with displacement of 24 bits, the two addressing modes of absolute addresses of 24 bits, and the instruction having the long word size. The remaining instructions are shared between the low-order CPU and the CPU 1 so that the CPU 1 has an instruction format compatible with the low-order CPU.

FIG. 17 shows an example of correspondences between the data of the register specifying portion in the instruction format and the registers to be specified by the former.

The register specifying portion specifies the numbers (0 to 7) of the registers with the bits 0 to 2, and the bit 3 specifies which the general registers Ri belong to the high- or low-order, when in the byte size, and which the registers belong to the general ones Ri or the expansion ones Ei, when in the word size. Incidentally, the bit 3 is ignored and substantially absent, as described above, in the utilizations as the long word size data and the address registers.

Figure 18:
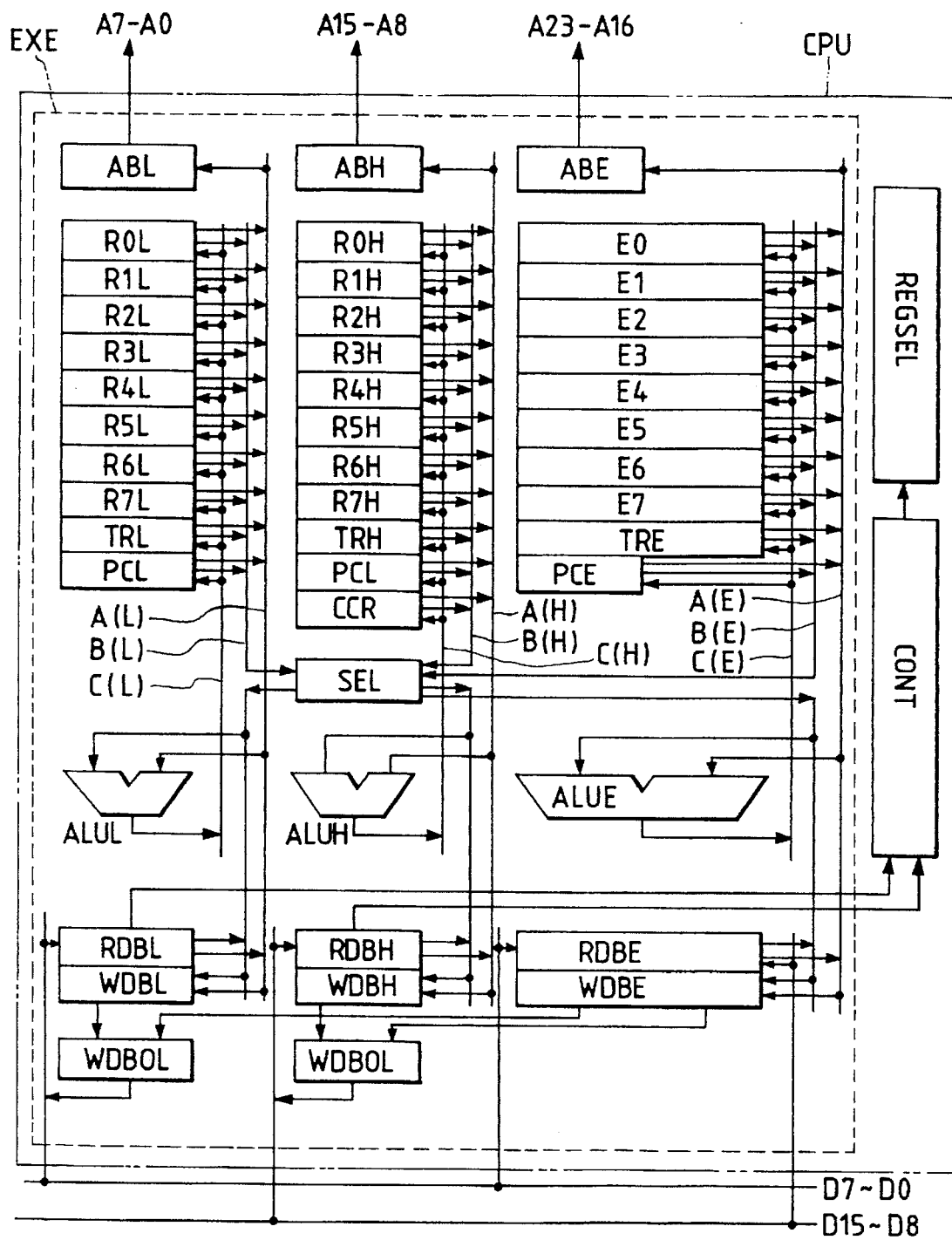
FIG. 18 is a block diagram showing one example of the CPU according to the present embodiment.
Figure 21A:
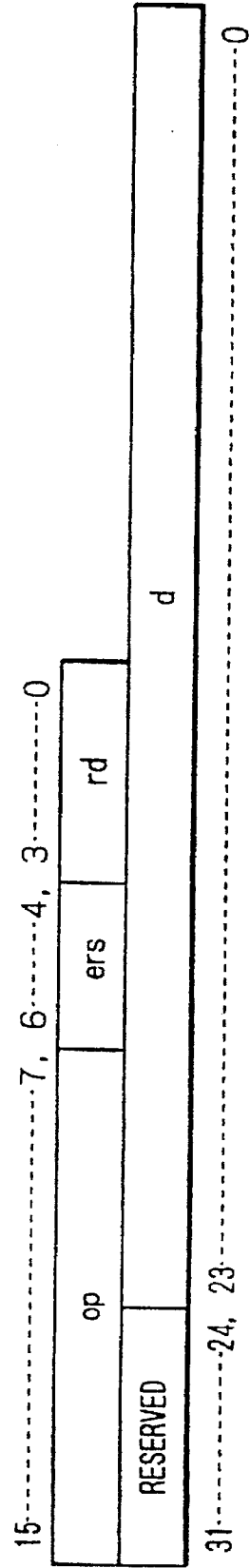
FIGS. 21A and 21B is an explanatory diagram showing another instruction format utilizing a prefix code.
Figure 21B:
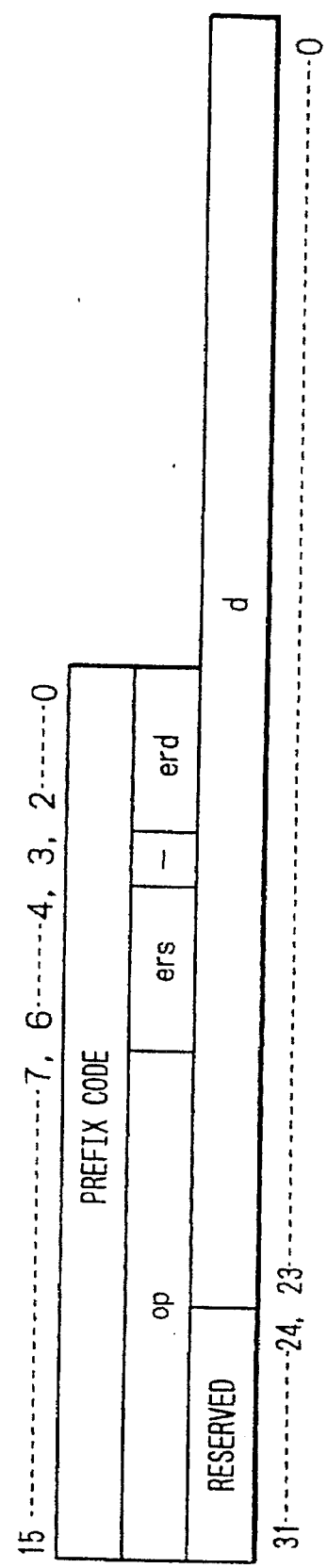

FIG. 18 is a block diagram showing the inside of the CPU 1. This CPU 1 is constructed to include: a control unit CONT composed mainly of a micro ROM or PLA (i.e., Programmable Logic Array); an execute unit EXE including the aforementioned general registers and R0H to R7L and T7H, expansion registers E0 to E7, program counters PC (PCL, PCH, PCE) and condition code register CCR; and a register select unit REGSEL. The control unit CONT fetches and decodes an instruction to generate a variety of signals necessary for executing the instruction or to control the execution procedure of the instruction. The register select unit REGSEL generates a register select signal according to the decoded result of the aforementioned instruction.

The execute unit EXE includes temporary registers TRL, TRH and TRE, arithmetic logic units ALUL, ALUH and ALUH, read data buffers RDBL, RDBH and RDBE, write data buffers WDBL, WDBH and WDBE, and address buffers ABL, ABH and ABE. These components are connected through three internal buses A (L, H, E), B (L, H, E) and C(L, H, E) and through a selector circuit unit SEL. The read data buffers RDBL, RDBH and RDBE are connected with external data buses D7 to D0 and D15 to D8. The write data buffers WDBL, WDBH and WDBE are connected through write data output buffers WDBOL and WDBOH with the aforementioned data buses D7 to D0 and D15 to D8. The arithmetic logic units ALUL, ALUH and ALUE are used for a variety of operations specified by an instruction, an addition of the program counter PC and a calculation of effective addresses. The read data buffers RDBL, RDBH and RDBE temporarily latch the instructions or data which are read from the ROM 2, the RAM 3 or not-shown external memories, and the write data buffers WDBL, WDBH and WDBE temporarily latch the data to be written in the ROM 2, the RAM 3 or the external memories. As a result, the internal operations of the CPU 1 and the read/write operations outside of the CPU 1 are timed. The address buffers ABL, ABH and ABE temporarily latch the addresses to be read/written by the CPU 1.

Although not especially limitative, each circuit block in the aforementioned execute unit EXE is basically constructed of two blocks of 8 bits and one block of 16 bits. The general registers are constructed of two blocks of 8 bits such that the blocks R0H to R7H correspond to the bits 15 to 8 whereas the blocks R0L to R7L correspond to the bits 7 to 0. The more significant bits, i.e., the bits 31 to 16 of the general registers correspond to the expansion registers E0 to E7 of one block of 16 bits. The internal buses A, B and C are arrayed in parallel to correspond to those bits 31 to 16, bits 15 to 8 and bits 7 to 0, respectively. The remaining temporary registers arithmetic logic units ALU, read data buffers and write data buffers are made similar. These components do not have their physical arrangement especially limited.

In case such general registers Ri and expansion registers Ei are provided to use the address space of 16 Mbytes while maintaining the compatibility with the low-order CPU, it is advisable to make an instruction system in which main calculations are executed between the registers for the low-order CPU but the calculations of the memories and the registers are not directly (with one instruction).

Firstly, in case the low-order CPU supports direct calculations between the memories and the registers to optimize the instruction system, it is difficult to add a new instruction for the high-order CPU. Specifically, as to the calculations of the memories and registers, the kinds of operation codes to be determined by the combination between the addressing modes of the memories and the kinds of the calculations are drastically increased to make it difficult to add new operation codes. In other words, the new operation code cannot be necessarily optimized to enlarge the instruction length so that the program has its size enlarged and its execution efficiency deteriorated.

Secondly, in order to utilize the address space of 16 Mbytes effectively, the aforementioned complicated addressing modes are necessary. This is because if such complicated addressing modes are made executable for most of instructions, the construction of the control unit CONT is complicated against the object of minimizing the logical and physical scales. For accessing the memories, the data transfers with the registers may be executed in response to a transfer instruction having the aforementioned various addressing modes thereby to handle or calculate the data on the registers. The general registers Ri can be used as sixteen registers at the maximum for the length of 8 bits whereas the general registers Ri and the expansion registers Ei can be used as sixteen registers at the maximum for the length of 16 bits, and the data necessary for a handling can be placed on the registers. Alternatively, at least most of the data having a high using frequency can be placed on the registers. Thus, it is thought that there hardly arises a disadvantage such as an increase in the handling programs or a reduction in the execution speed.

There are bit manipulation instructions as those which have to operate the memories. These bit manipulation instructions are not the data, which are handled at the byte unit although they are specified as the n-th bits of the addresses assigned at the byte unit, but the individual bits have independent functions. In case of a register for controlling the operation of a timer, for example: the clock of the timer is selected at the bit 1; whether or not a timer counter is cleared is specified at the bit 2 if the contents of the timer counter and a comparison register are identical; whether or not an interruption occurs is specified at the bit 3 if the aforementioned contents are identical. The bit manipulation instructions have to be set to 1 at the unit of 1 bit or cleared to 0. Alternatively, the aforementioned data of 1 bit have to be decided in case the handling program of the CPU 1 is different depending upon whether the predetermined 1 bit of the input port is at 0 or 1. These 1-bit data have to be directly operated for the memories. This is because if the bit manipulation is executed after the once transfer to the registers at the byte unit, an interruption arises between the aforementioned transfer and the bit manipulation to raise a disadvantage that the aforementioned input port has its value changed, for example. However, the address to be manipulated by such bit manipulation instruction is so fixed that it does not require any complicated addressing mode. It is sufficient to execute the absolute address and the register indirect at the least. In case of the absolute address, moreover, it is thought unnecessary to use the whole address space need but sufficient to use the address range in which the aforementioned timer and the input/output ports are present. 8 bits are sufficient as the absolute address which can be used for specifying such address range. If the absolute address has 16 bits, the usable address range is expanded, but the instruction length is so enlarged to complicate the controls. It seems very rare to have to use the whole space of 16 Mbytes at least as 24 bits. Therefore, the CPU 1 in the present embodiment supports the bit manipulation instructions for the direct operations between the internal registers such as the general registers and the external registers such as the control registers of the peripheral circuit. However, the bit manipulation instructions of 1 or several bits will not extremely increase, even if executed directly with the external peripheral circuits, the scale of the control unit or the kinds of instructions.

FIG. 19 shows one example of the relations between the functions of instructions and the combinations of the addressing modes.

In FIG. 19: letter # designates the addressing mode of an immediate; letter R the addressing mode of a register direct; letters @R the addressing mode of a register indirect; letters @(d16, R) and @(d24, R) the addressing modes of registers indirect with displacement; letters @–R the addressing mode of a pre-decrement register indirect; letters @R+ the addressing mode of a post-increment register indirect; letters @a8, @a16 and @a24 the addressing modes of absolute addresses; and letters @(d8, PC) and @(d16, PC) the addressing modes of program counters relative. In FIG. 19, moreover, letters B, W and L designate a byte, a word and a long word, respectively. The program counters relative are especially for branch instructions. The remaining addressing modes can be used in the transfer instructions. The operation instructions can use the immediate and the register direct. However, the single term operation is only the register direct.

In FIG. 19, those to be supported by the low-order CPU are encircled. The long words to be incremented/decremented are operated with the word size because the address registers in the low-order CPU have the word size.

The arithmetic operation instructions can use the byte, the word and the long word, as described above, the addition or subtraction with carry or borrow can use only the byte size. In the increment and decrement, the "±1" can use the byte, the word and the long word in case the registers are to be counted, and the "±2" and the "±4" can use the long word only because they are for address calculations. The logical operation instruction, the shift instruction and the locate instruction can use the byte, the word and the long word although not especially limitative thereto. This is because these instructions seem to be frequently used for working letter data such as for inverting the black and white or for italicizing the letters in case the letter data of a printer are to be handled as an application of using the address space of 16 Mbytes. In the low-order CPU supporting the address space of 64 Kbytes, on the other hand, the logical operation instructions, the shift instructions and the locate instructions can use only the bytes although not especially limitative thereto.

Even in the instruction system in which the main operations are executed between the registers but not any direct operation between the memories and the registers, as described above, it may be difficult to add new operation codes. If, in this case, the transfer instructions and operation instructions of the long word size are prepared by adding a prefix code of 1 word to the corresponding instructions of the word size, especially the logical and physical scales of the control unit can be minimized.

FIGS. 20A, 20B, 21A, and 21B show one example of instruction formats utilizing the prefix code.

The long word size is expressed by providing the prefix code of 1 word before the instruction format of the word size of the register indirect with displacement, as described above. The prefix code has not to be superposed over the instruction code of the low-order CPU so that it is optimized if it corresponds to the code of an undefined instruction. In addition, the operand specifying field of an instruction such as the non-operation (NOP) instruction requiring no substantial information of the operand specifying field can be utilized, if satisfied by a predetermined code, as the prefix code.

Figure 22:
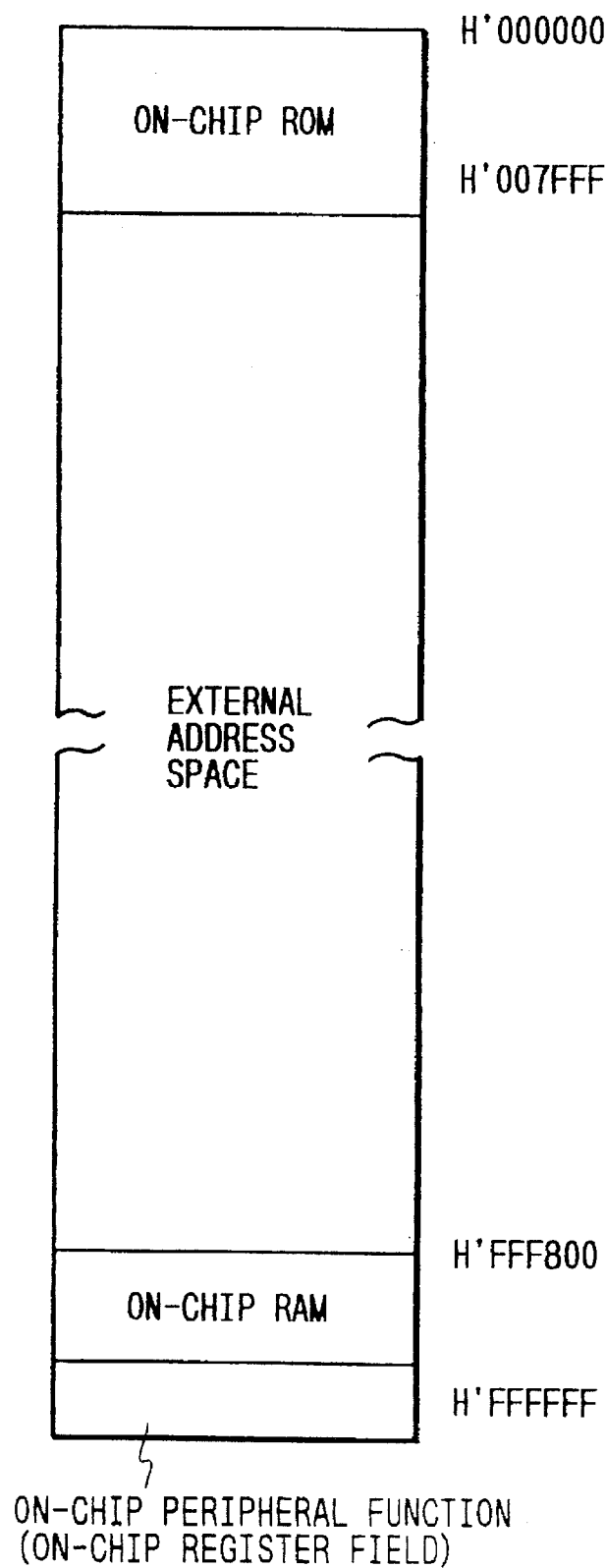
FIG. 22 is an address map of the microcomputer according to one embodiment of the present invention.

FIG. 22 shows an address map of such microcomputer.

The on-chip ROM is arranged from the address H'00000, and the on-chip peripheral function and the on-chip RAM are arranged on and after H'FF800 while leaving the intermediate space as the external space. The on-chip peripheral function and the on-chip RAM can be arranged midway of the address space, e.g., from H'0F800 to H'0FFFF. In this case, however, the external space is separated into two portions, and the program written in the on-chip ROM and the program existing in the external space cannot be continuously used as contrary to the object of the present invention. Therefore, the on-chip ROM to be preserved mainly for the program area and the on-chip peripheral function and on-chip RAM to be preserved mainly for the data area should be arranged at the opposite sides of the address space while leaving a continuing intermediate space. Of these, the on-chip ROM should include the start address or the address storing the start address.

Incidentally, in order to code-extend the more significant 8 bits thereby to generate the effective address, the absolute address of 16 bits has its specifying range of H'000000 to H'007FFF and H'FF8000 to H'FFFFFF and can specify the 32 Kbytes of the on-chip ROM, the on-chip RAM and the on-chip peripheral function. Like the low-order CPU, the on-chip functional block can be specified with the absolute address of 16 bits excepting the portion of the on-chip ROM larger than 32 Kbytes. As a result, the software can be easily transferred from the low-order CPU. On the other hand, the register indirect with displacement of 16 bits has its specified range identical to that of a reference address when the displacement is interpreted as the reference address whereas the content of the register is interpreted as a relative value.

Although the address space is assumed to have 16 Mbytes in the embodiment described above, and although an extended function is necessary in the present invention, the address space of 64 Kbytes is thought sufficient for applications as in the prior art.

For example, in case the packaging area of an application system is to be reduced by using not any external space but all the terminals of the single-chip microcomputer as the input/output ports, the address space of 64 Kbytes raises no problem as in the prior art if the on-chip area has a total value of 64 Kbytes or less.

In this application, it is sufficient at the unit of 16 bits, i.e., 2 bytes to read a vector or to stack the program counter. It is wasteful and reduces the execution time period and the using efficiency of the memories to make an access of 4 bytes.

Although not especially limitative, the mode to be operated in the address space of 64 Kbytes is defined as the minimum mode, and the mode to be operated in the address space of 64 Kbytes or more is defined as the maximum mode. Incidentally, these minimum mode and maximum mode are suitably specified by the terminals MODE1 to MODE3 of FIG. 1.

FIG. 23 shows the differences of the operations of the CPU in the minimum mode and the maximum mode.

In the maximum mode, as described above, the maximum of the address is 24 bits, and the vector, the exception-handling stack and the sub-routine stack are all at the unit of 4 bytes including the address of 24 bits.

In the minimum mode, the maximum of the address is 16 bits, and both the vector and the sub-routine calling are condensed to 2 bytes corresponding to the 16 bits of the address. Although not especially limitative, moreover, the CPU 1 is given the so-called "post-increment register indirect" and the "pre-decrement register indirect" as the addressing mode, and the address register is renewed at the less significant 16 bits. In short, the expansion registers are not renewed. Contrary to the maximum mode, the minimum mode can realize a high speed and improve the memory utilizing efficiency.

FIGS. 24A and 24B shows data formats on the memory in the minimum mode and the maximum mode.

In the maximum mode, the vector is arranged with the leading end at an address of multiples of 4 at the unit of 4 bytes. The leading 1 byte is a reserved area, and the remaining 3 bytes are used as start addresses. The stack is arranged, for both the exception-handling and sub-routine calling operations, with the leading end of even addresses at the unit of 4 bytes.

In the minimum mode, the vector is arranged with the leading end of even addresses at the unit of 2 bytes. These are used as the start address (i.e., the less significant 16 bits whereas the more significant 8 bits are deemed as 0). The stack stores the CCR, the preserved area and the less significant 16 bits of the PC with the leading end of even addresses at the unit of 4 bytes. At the sub-routine calling time, the less significant 16 bits of the PC are stored with the leading end of even addresses at the unit of 2 bytes.

If these minimum mode and maximum mode are prepared, the CPU 1 operating in the minimum mode can realize the high-order compatibility at the object program level.

If this single-chip microcomputer is to be tested, it is desirable that the vector area can be used as the external memory in both the minimum mode and the maximum mode. In order to utilize a wide address effectively, the maximum mode is thought to set the ROM invalid extension mode, in which the vector area acts as the external memory, thus raising no problem. In case, however, the minimum mode is limited to the single-chip mode, the vector area has to be used as the external memory for the minimum testing. At the testing time, the content of the on-chip ROM stores the program of the user so that the manufacturer cannot utilize it. This is because the switching function of the vector structure in the minimum mode and the maximum mode cannot be tested.

For this difficulty, registers to be read and written only in the testing mode may be provided so that the minimum mode and the ROM invalid extension mode can be set by setting the bits. It is sufficient at the minimum that the data can be inputted from the outside when the vector area on the ROM is read.

According to the embodiment thus far described, the following effects can be obtained.

(1) The registers (Ri+Ei) of total 32 bits are used wholly or partially as address registers such that the expansion registers of 16 bits are added to the general registers of 16 bits of the CPU of 8 bits, and the data registers are halved at the unit of total 32 bits into two data registers (Ei, Ri) of 16 bits, one of which is further halved into two registers (RiH, RiL) of 8 bits. Moreover, whether the registers are to be used as the 8-bit ones or the 16-bit ones is determined by the size bit of the data information included in the operation code. When the data information has a size of 8 bits (i.e., 1 byte), the high-order (RiH) and low-order (RiL) of the 8-bit registers are specified by the predetermined 1 bit of the register specifying field included in the instruction. When the data information has a size of 16 bits (i.e., 1 word), said predetermined 1 bit specifies the high-order (Ei) and low-order (Ri) of the 16-bit registers. Moreover, the utilization as the 32-bit registers (Ri+Ei) is specified by the prefix code of the instruction including the operation code. Alternatively, a new operation code having the same bit number as that of the operation code of the low-order CPU is additionally specified. Thus, the register construction of the CPU 1 including the register specifying method includes the register construction of the low-order CPU. On this basis, an instruction execute function to be supported by the low-order CPU having the 16-bit general registers is included in the CPU 1. As a result, the program developed for the low-order CPU can be utilized at least at the level of the source program by the high-order CPU 1. In other words, the upper compatibility can be realized at least at the source program level.

(2) For the operation modes for switching the bit number of effective addresses and the unit sizes of a vector and a stack in accordance with the using modes of the aforementioned registers Ei, Ri, RiH and RiL, there are prepared the maximum mode and the minimum mode to enable the CPU 1 operating in the minimum mode to realize the upper compatibility at the object program level.

(3) By adopting the prefix code in the instruction utilizing the long word data, the instruction system, in which main operations are executed between the registers but no direct operation is carried between the memories and the registers, is enabled to cope with the case, in which a new operation code is difficult to add, while remarkably suppressing the increase in the logical/physical scales of the control unit.

(4) By adopting the code corresponding to the code of an undefined instruction as the prefix code, it is possible to completely block the overlap with another operation code.

(5) By using the registers Ri and Ei of total 32 bits wholly or partially as the address registers, by halving them into the 16-bit registers and by using one of the 16-bit registers as 8-bit resistors, a wide address space of 16 Mbytes can be used while executing the data processing efficiently.

(6) By setting the instruction length to the unit of 2 bytes to giving the 24-bit absolute address and displacement 4 bytes including a reserved area, it is use the address space of 4 Gbytes in the future.

(7) By equalizing the number of registers to be used as the 8-bit registers and the number of registers to be used as the 16-bit registers, it is possible to shorten the instruction length thereby to improve the program efficiency.

(8) By constructing the register specifying portion in the instruction code of 3 bits specifying the entirety of the register and 1 bit specifying a portion of the register, it is possible to reduce the logical/physical scales of the register select circuit.

(9) By using the least significant bit of the effective address specifying portion in the instruction code as the least significant bit of the word in the instruction code, the constructions of the execute unit and the control unit can be simplified to reduce the logical and physical scales.

(10) The address space of 64 Kbytes or more can be used by minimizing the logical and physical scales of the single-chip microcomputer 100.

Although our invention has been specifically described in connection with its embodiment, it should not be limited thereto but can naturally be modified in various manners without departing from the scope thereof.

For example, the CPU 1 has its block construction, register construction and specific logical circuit examples not limited in the least. The bit number of the registers or the number of the registers can be arbitrarily selected. The method of calculating the addressing mode and the effective address can be modified in various manners.

Although our invention has been applied to the case in which it is applied to the single-chip microcomputer providing the background thereof, it should not be limited thereto but can be applied to another data processing system. For example, the invention can be applied to the case in which the scale of data is more important than the processing performance of the data.

The effects to be obtained by the representative of the invention thus far disclosed will be briefly described in the following.

(1) By including both the register construction of another data processing system such as the low-order CPU including the register specifying method and the instruction executing function of the low-order CPU, the program developed for the low-order CPU can also be utilized at least at the level of the source program by the data processing system according to the present invention, and the upper compatibility at least at the source level can be realized.

(2) By preparing in advance the operation mode for switching the bit number of effective addresses and the unit sizes of the vector and the stack in accordance with the utilizing mode of the registers, the upper compatibility at the object program level can be easily realized.

(3) The data latch means, which is constructed wholly of 32 bits by adding the 16-bit expansion registers to the 16-bit general registers of the 8-bit CPU, can be used for latching the data in its entirety, in one divided half or in a quarter divided from the one half, so that the usability of the data latch means on the software and hardware to achieve a reduction of the logical and physical scales of the data processing system. As to the latch of the address data using the entirety or a portion of the data latch means, moreover, the address space to be linearly utilized can be easily expanded, and it is more easy to make and compile the program than the address space expanding technology resorting to the page register. As a result, it is possible to efficiently execute a program which is made in high-level languages.

(4) If the operation instruction of n-bit data and the operation instruction of 2n-bit data are considered, each of the data latch means is constructed such that it has the portion, which is halved for use from the entirety, and the portion which is further halved for use from one half, and the aforementioned data latch means is provided such that the total number of the portions halved for used is equal to that of the portions further halved for use. As a result, the instruction length can be shortened to improve the program efficiency.

(5) By making the unit of the instruction twice as long as the unit of the data, it is easy to cope with the expansion of the address space in the future. By setting the least significant bit of the effective address specifying portion in the instruction code to the least significant bit of the word in the instruction code, moreover, the constructions of the execute means and the control means can be simplified to contribute to the reduction in the logical and physical scales.

(6) By causing the portion specifying the data latch means to adopt the instruction format fixed in one portion in the unit of the instruction, it is possible to reduce the logical and physical scales of either the select circuit for the aforementioned data latch means such as the register or the instruction decode circuit. In this case, moreover, the aforementioned specifying portion is constructed of an area for specifying the desired data latch means from a plurality of units and an area for specifying any portion in one data latch means, and it is decided on the basis of the data size specified in the instruction which the area for specifying any portion in the aforementioned data latch means specifies any portion of one half for any portion of one half of the half. As a result, the bit number of the register specifying portion in the instruction format can be minimized even if the data stored in the data latch means and the address data extend over several kinds of bytes, words and long words.

(7) As a result, the continuously usable address space can be relatively widened while minimizing the increase in the logical/physical scales and while realizing the upper compatibility with the low-order CPU, in which the program already developed for another data processing system such as the low-order CPU can be partially or wholly utilized.

What is claimed is:

1. A single chip data processing device having a first mode and a second mode, the single chip data processing device comprising:

general purpose registers (Ei+RiH+RiL, i=0 to 7, in FIG. 4 or FIG. 18), each having a predetermined bit length (e.g., 32 bits) and each including a first portion (Ei, i=0 to 7, in FIG. 4 or FIG. 18) and a second portion (Ri=RiH+RiL, i=0 to 7, in FIG. 4 or FIG. 18);

a first arithmetic and logic operation unit (ALUE in FIG. 18) coupled to the first portion of the general purpose registers;

a second arithmetic and logic operation unit (ALUL and ALUH in FIG. 18) coupled to the second portion in the general purpose registers;

wherein the first mode enables the first and second arithmetic and logic operation units (ALUE, ALUL, and ALUH) to execute an address operation and a data operation; and wherein the second mode enables the second arithmetic and logic operation unit (ALUL and ALUH) to execute an address operation and a data operation and enables the first arithmetic and logic unit to execute a data operation.

2. The single chip data processing device according to claim 1, further comprising:

an external terminal (MODE1 to 3) which receives a mode signal (MODE1 to 3) for determining whether the single chip data processing device is operated in the first or the second mode.

3. The single chip data processing device according to claim 1, further comprising:

a central processing unit (1) including the general purpose registers and the first and the second arithmetic and logic operation units;

an internal bus (69) coupled to the central processing unit, wherein the internal bus being supplied with address signals from one of the general purpose registers in the central processing unit;

a first memory (2) coupled to the internal bus and storing program data for the single chip data processing device;

a second memory (3) coupled to the internal bus providing a working area of the central processing unit;

wherein an address space of the central processing unit includes a first region in which addresses of the first memory are arranged, a second region in which addresses of the second memory are arranged, and a third region between the first region and the second region and for addresses of an external space; and wherein an address space of the third region in the first mode is larger than that of the third region in the second mode.

4. The single chip data processing device according to claim 3, wherein the first portion is a high-order register and the second portion is a low-order register, wherein the high-order register and the low-order register cooperate in the first mode to define a combined register and address data is stored in the combined register in the first mode, and wherein address data is stored in the low-order register in the second mode.

5. A single chip data processing device comprising:

general purpose registers each including a first portion having a first predetermined bit length and a second portion having a second predetermined bit length;

a first arithmetic and logic operation unit coupled to the first portion of the general purpose registers;

a second arithmetic and logic operation unit coupled to the second portion in the general purpose registers; and, a mode control means connected with the first and second arithmetic and logic operation units for controlling the first and second arithmetic units such that:

in a high-order mode, both the first and second arithmetic and logic operation units cooperatively retrieve a first address portion from the first general purpose register portion and a second address portion from the second general purpose register portion and execute an address operation to access a first address area, and in a low-order mode, (i) the second arithmetic and logic operation unit retrieves the second address portion and executes an address operation to access a second address area which is a smaller, subset of the first address area while (ii) the first arithmetic and logic operation unit executes a data operation.

6. The single chip data processing device according to claim 5, wherein the first portion is a high-order register and the second portion is a low-order register, wherein the high-order register and the low-order register cooperate in the first mode to define a combined register and address data is stored in the combined register in the first mode, and wherein address data is stored in the low-order register in the second mode.

7. A data processing method comprising:

providing a two mode single chip data processing device which includes general purpose registers, each including a first portion having a first bit length and a second portion having a second bit length, a first arithmetic and logic operation unit coupled to the first portion of the general purpose registers, and a second arithmetic and logic operation unit coupled to the second portion in the general purpose registers;

in a first mode, executing one of (i) an address operation using the first and second arithmetic and logic operation units cooperatively to process addresses of greater than the second bit length and (ii) a data operation using the first and second arithmetic operation units cooperatively to process data of greater than the first bit length; and in a second mode, concurrently (a) executing (i) an address operation using the second arithmetic and logic operation unit alone to process addresses of up to the second bit length and (b) executing a data operation with the first arithmetic and logic unit alone to process data of up to the first bit length.

* * * * *